United States Patent
Koide et al.

(10) Patent No.: US 8,374,193 B2
(45) Date of Patent: Feb. 12, 2013

(54) COMMUNICATION METHOD AND COMMUNICATION DEVICE

(75) Inventors: Youhei Koide, Fukuoka (JP); Kensuke Yoshizawa, Fukuoka (JP); Yoshio Urabe, Nara (JP)

(73) Assignee: Panasonic Corporation, Osaka (JP)

( * ) Notice: Subject to any disclaimer, the term of this patent is extended or adjusted under 35 U.S.C. 154(b) by 556 days.

(21) Appl. No.: 12/642,305

(22) Filed: Dec. 18, 2009

(65) Prior Publication Data

US 2010/0158039 A1  Jun. 24, 2010

(30) Foreign Application Priority Data

Dec. 18, 2008 (JP) .............................. P. 2008-322278

(51) Int. Cl.
*H04L 12/42* (2006.01)
*H04J 3/02* (2006.01)
(52) U.S. Cl. .................... 370/455; 370/458; 370/462
(58) Field of Classification Search .................. 370/455, 370/458, 462
See application file for complete search history.

(56) References Cited

U.S. PATENT DOCUMENTS

| 7,352,770 | B1 | 4/2008 | Yonge | |
|---|---|---|---|---|
| 2004/0151197 | A1* | 8/2004 | Hui | 370/412 |
| 2004/0184406 | A1 | 9/2004 | Iwamura | |
| 2006/0120358 | A1* | 6/2006 | Narasimhan et al. | 370/355 |
| 2007/0064720 | A1 | 3/2007 | Sterenson | |
| 2007/0070966 | A1* | 3/2007 | Sung et al. | 370/338 |
| 2007/0091925 | A1* | 4/2007 | Miyazaki et al. | 370/469 |
| 2008/0285596 | A1* | 11/2008 | Hady et al. | 370/503 |
| 2008/0301253 | A1 | 12/2008 | Ohmi | |
| 2010/0067516 | A1* | 3/2010 | Sun et al. | 370/350 |
| 2010/0254263 | A1* | 10/2010 | Chen et al. | 370/232 |
| 2010/0316017 | A1* | 12/2010 | Masaoka | 370/330 |
| 2011/0069615 | A1* | 3/2011 | Zhang et al. | 370/235 |
| 2011/0122887 | A1* | 5/2011 | Ma et al. | 370/413 |
| 2012/0127909 | A1* | 5/2012 | Lee et al. | 370/312 |

FOREIGN PATENT DOCUMENTS

JP        2 002-185473        6/2002

OTHER PUBLICATIONS

International Search Report dated Jun. 5, 2010.

\* cited by examiner

*Primary Examiner* — Andrew Lee
(74) *Attorney, Agent, or Firm* — Dickinson Wright PLLC

(57) ABSTRACT

A communication method for performing a communication among a plurality of communication devices sharing a communication band, includes a first step of transmitting notification signal during a first period to notify information for arbitrating the communication device capable of performing data transmission during a second period subsequent to the first period, and a second step of transmitting data from the communication device, capable of performing the data transmission during the second period based on the notification signal transmitted during the first period, in specific period in the second period allocated to the data transmitted from the communication device.

28 Claims, 29 Drawing Sheets

| PGA0 | PGA1 | ACCESS RIGHT |
|---|---|---|
| SIGNAL | SIGNAL | PG3 (HIGHEST LEVEL) |
| SIGNAL | NO SIGNAL | PG2 |
| NO SIGNAL | SIGNAL | PG1 |
| NO SIGNAL | NO SIGNAL | PG0 (LOWEST LEVEL) |

FIG. 9

| PG3 | NUMBER OF CYCLIC SLOTS = 2 |
|---|---|
| SLOT 1 → | TERMINAL A & PRIORITY 7 |
| SLOT 2 → | TERMINAL B & PRIORITY 6 |
| PG2 | NUMBER OF CYCLIC SLOTS = 1 |
| SLOT 1 → | TERMINAL C & PRIORITY 5 |
| PG1 | NUMBER OF CYCLIC SLOTS = 4 |
| SLOT 1 → | TERMINAL A & PRIORITY 3 |
| ⋮ | ⋮ |

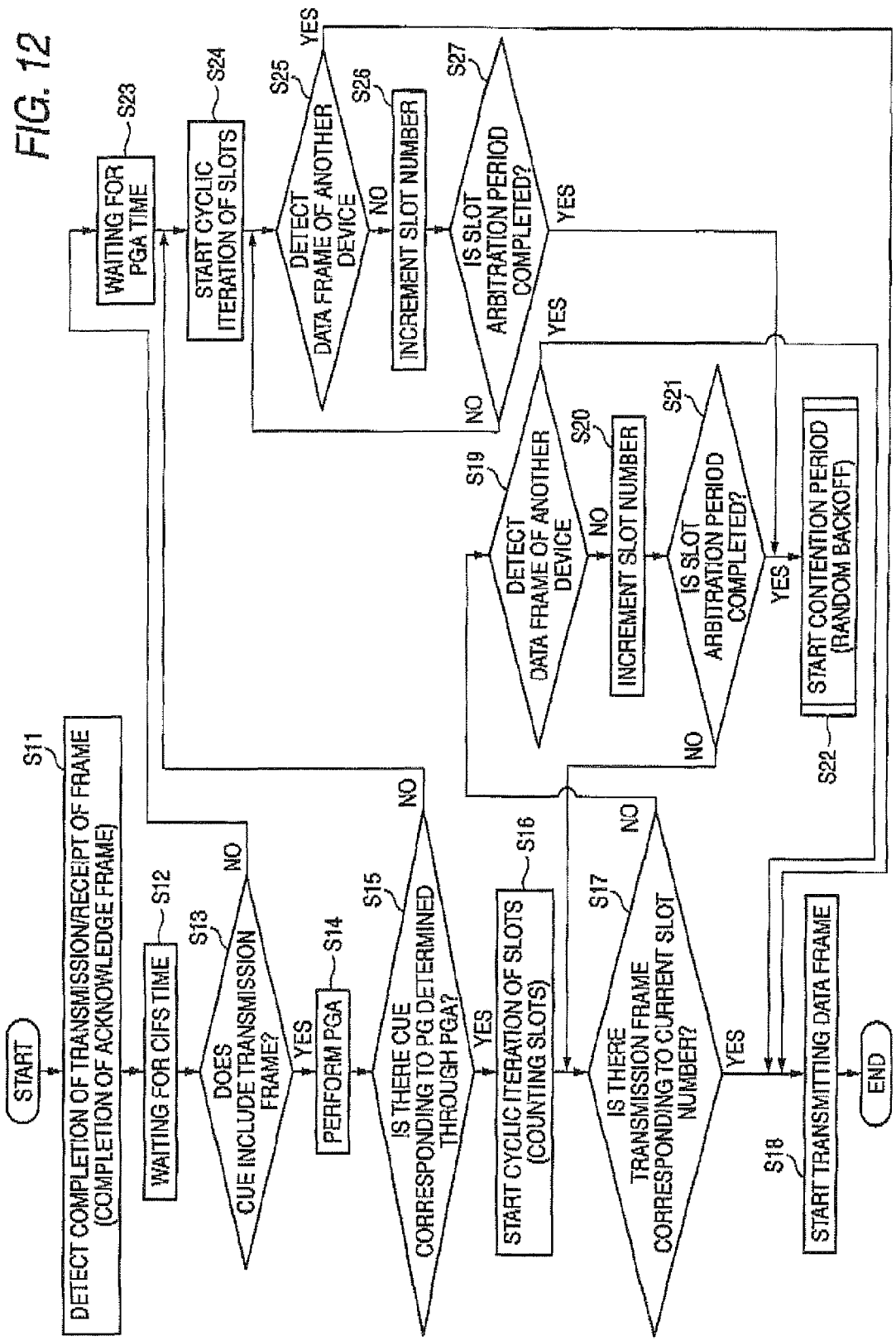

| PG3 | NUMBER OF CYCLIC SLOTS = 2 |
|---|---|
| SLOT 1 → TERMINAL A & PRIORITY 7 | |
| SLOT 2 → TERMINAL B & PRIORITY 6 | |
| PG2 | NUMBER OF CYCLIC SLOTS = 0 |
| PG1 | NUMBER OF CYCLIC SLOTS = 4 |
| SLOT 1 → TERMINAL A & PRIORITY 3 | |
| ⋮ | ⋮ |

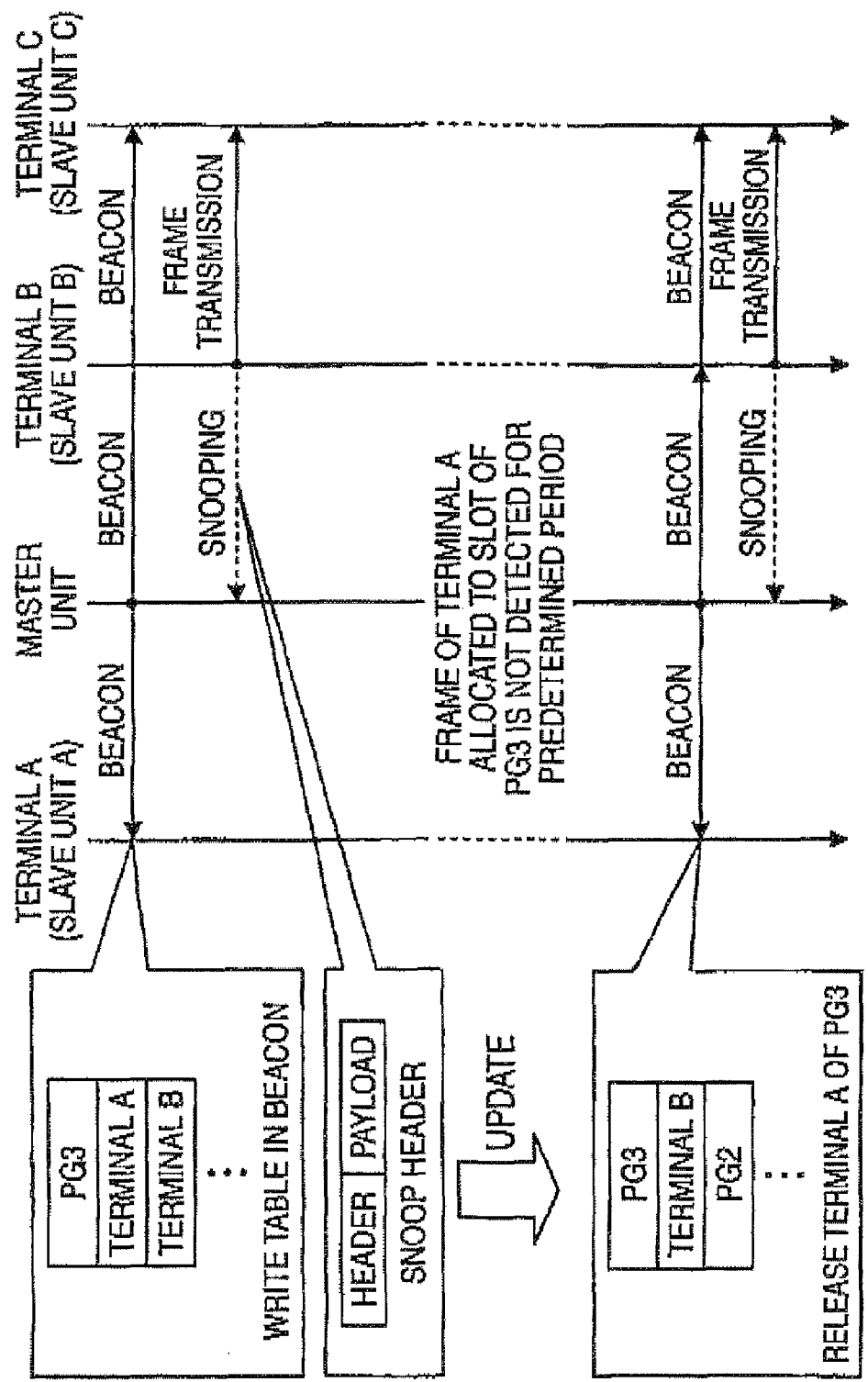

| | | |
|---|---|---|
| PGA PRESENCE/ABSENCE INFORMATION = 0 → | ▨ | RESERVED |
| | PG3 | NUMBER OF CYCLIC SLOTS = 0 |
| | PG2 | NUMBER OF CYCLIC SLOTS = 0 |
| | PG1 | NUMBER OF CYCLIC SLOTS = 6 |
| SLOT 1 → | TERMINAL A & PRIORITY 3 | |
| | ⋮ | |
| SLOT 6 → | TERMINAL F & PRIORITY 3 | |
| | PG0 | NUMBER OF CYCLIC SLOTS = 0 |

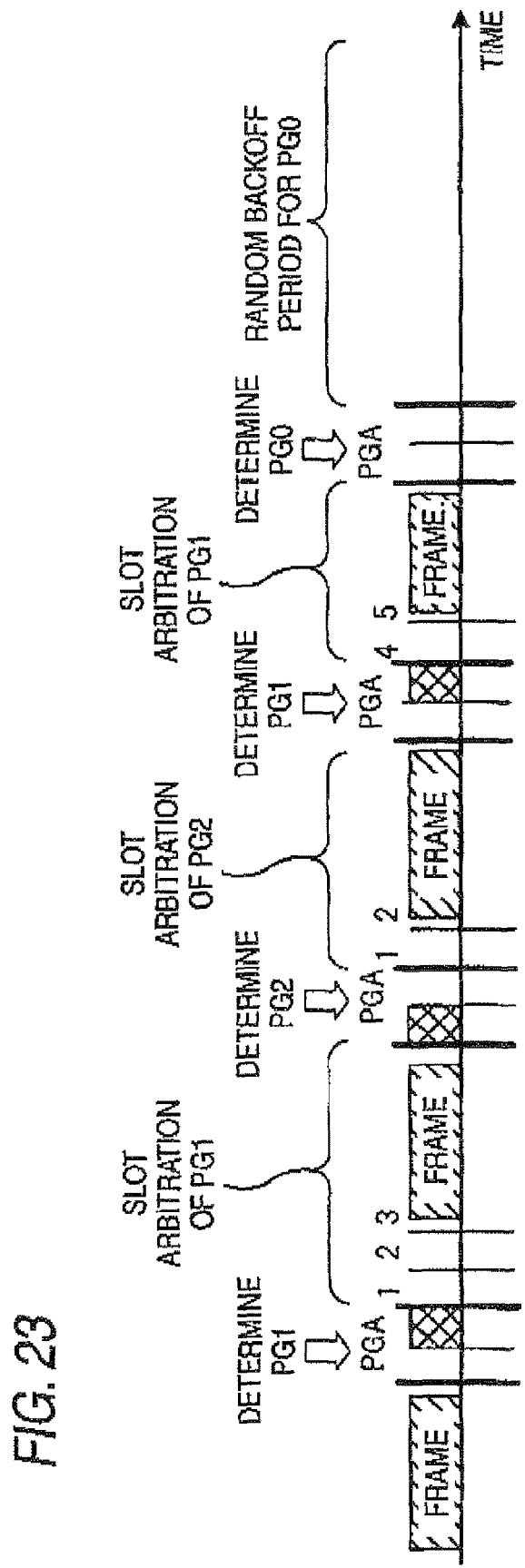

*FIG. 26*

CYCLIC SLOT ITERATION SCHEME INFORMATION

| PG3 | | NUMBER OF CYCLIC SLOTS = 3 |
|---|---|---|

SLOT 1 → TERMINAL A & PRIORITY 7
SLOT 2 → TERMINAL B & PRIORITY 7
SLOT 3 → TERMINAL B & PRIORITY 6

| PG2 | | NUMBER OF CYCLIC SLOTS = 1 |
|---|---|---|

SLOT 1 → TERMINAL C & PRIORITY 5

| PG1 | | NUMBER OF CYCLIC SLOTS = 6 |
|---|---|---|

SLOT 1 → TERMINAL A & PRIORITY 3

⋮

| PRS0 | PRS1 | ACCESS RIGHT |
|---|---|---|
| SIGNAL | SIGNAL | CA3 (HIGHEST LEVEL) |
| SIGNAL | NO SIGNAL | CA2 |
| NO SIGNAL | SIGNAL | CA1 |
| NO SIGNAL | NO SIGNAL | CA0 (LOWEST LEVEL) |

COMMUNICATION METHOD AND COMMUNICATION DEVICE

BACKGROUND

The present invention relates to a communication method and a communication device that establish a communication among a plurality of communication devices sharing a communication band.

In a communication system in which a communication is established among a plurality of pieces of communication equipment sharing a communication band, such as a power line communication, a wireless LAN (Local Area Network), and the like, the plurality of pieces of communication equipment carry out communication by use of a single transmission channel; hence, contention among accesses from the plurality of pieces of communication equipment must be avoided.

One method for avoiding collision is a CSMA/CA (Carrier Sense Multiple Access/Collision Avoidance) scheme. Under this scheme, respective pieces of communication equipment monitor the busy condition of the transmission channel and carry out transmission when another piece of communication equipment does not use the transmission channel. When the transmission channel is detected not being used by another piece of communication equipment, transmission of a frame is commenced after elapse of a random wait time (a random backoff time). Under a CSMA/CA scheme, even when a plurality of pieces of communication equipment attempt to perform transmission by way of a single transmission channel, initiation of transmission is made possible after elapse of the random backoff time. Therefore, the chance of occurrence of a collision of frames can be diminished. However, when an upper limit of the random value is made constant, collision becomes likely to occur with an increase in the number of accesses (the number of pieces of communication equipment connected to a network), so that a deterioration of performance is unavoidable. If the random value is increased with an increase in the number of pieces of connected equipment, collision probability will decrease. However, an average random backoff time will become longer, to thus deteriorate performance in any event. Moreover, since the scheme basically enables making of an access after elapse of a random backoff time, the maximum amount of delay cannot be defined.

SUMMARY

The present invention has been conceived in light of the circumstance and aims at providing a communication method and a communication device that can perform arbitration of contention among accesses within a comparatively short period of time even when the number of communication devices or data streams has increased and that can also prevent waste of a bandwidth, to thus prevent performance deterioration. Further, the present invention aims at providing a communication method and a communication device that enable avoidance of collision among communication devices having the same priority when priority control is performed. The present invention also aims at providing a communication method and a communication device that prevent imbalanced concentration of an access right on a specific communication device or data stream and make it possible to perform access control appropriate for a traffic condition, such as communication traffic and data traffic.

In order to achieve the above object, according to the present invention, there is provided a communication method for performing a communication among a plurality of communication devices sharing a communication band, comprising:

a first step of transmitting notification signal during a first period to notify information for arbitrating the communication device capable of performing data transmission during a second period subsequent to the first period; and a second step of transmitting data from the communication device, capable of performing the data transmission during the second period based on the notification signal transmitted during the first period, in specific period in the second period allocated to the data transmitted from the communication device.

According to the present invention, there is also provided a communication device used in a communication system for performing a communication among a plurality of communication devices sharing a communication band, comprising:

an arbitrary information notification section that transmits a notification signal during a first period to notify information for arbitrating a communication device capable of performing data transmission during a second period subsequent to the first period; and a data transmission section that, when the communication device transmitting the notification signal is determined as the communication device capable of performing the data transmission based on the notification signal transmitted during the first period, transmits data in specific period in the second period allocated to the data transmitted from the communication device, wherein a signal set on the basis of priority previously determined according to a data type is used as the notification signal in the first period.

The present invention makes it possible to perform arbitration of contention for accesses within a comparatively short period of time even when the number of communication devices or data streams has increased and also prevent waste of a bandwidth, to thus prevent performance deterioration. Further, the present invention can avoid collision among communication devices having the same priority when priority control is performed. The present invention also prevents imbalanced concentration of an access right on a specific communication device or data stream and makes it possible to perform access control appropriate for a traffic condition, such as communication traffic.

BRIEF DESCRIPTION OF THE DRAWINGS

FIG. 9 is a view showing an example of a table for allocating slots to respective priority groups.

FIG. 12 is a flowchart showing operation procedures of each of the communication devices comforting to the access control scheme of the present embodiment.

FIG. 15 is a sequence chart showing an example of processing for updating slot allocation information about each individual priority group.

FIG. 23 is a view showing a second example of access period of the cyclic slot iteration scheme.

FIG. 26 is a view showing an example of a slot allocation table conforming to the third example cyclic slot iteration scheme.

DETAILED DESCRIPTION OF EXEMPLARY EMBODIMENTS

One method for avoiding contention among accesses from a plurality of communication devices is a PRS (Priority Resolution Slot) scheme (see; for instance, Patent Document 1). The PRS scheme is an access scheme for setting priority groups into which priorities showing priority commensurate with types of data to be transmitted are divided, and for conducing arbitration for narrowing down the priority groups when frame transmission is carried out before contention is initiated by means of random backoff.

Figures 28, 29:
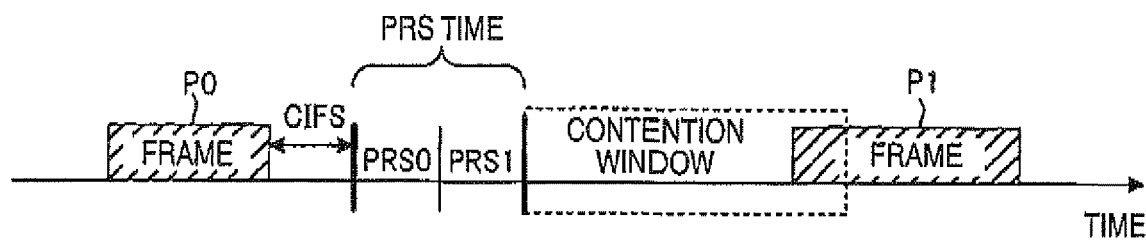
FIG. 28 is a view showing an example of access period when data are transmitted under the PRS scheme.
FIG. 29 is a view showing example arbitration signals for respective priority groups output during the PRS time.

FIG. 28 is a view showing example access period when data are transmitted under the PRS scheme. When any communication equipment finishes transmitting a frame P0, a PRS time (including PRS0 and PRS1) is set after a predetermined CIFS (Contention Inter-Frame Space) time is ensured, whereupon arbitration of the priority groups is conducted. During the PRS time, respective pieces of communication equipment send arbitrary signals, to thus perform arbitration as to which one of the priority groups has an access right. In the priority group assigned the access right through arbitration, the respective pieces of communication equipment make accesses by means of random backoff, or the like, in a contention window achieved after elapse of the PRS time, and the communication equipment which gained a win for contention transmits a frame P1.

FIG. 29 is a view showing example arbitration signals for respective priority groups output during the PRS time. The examples show that four levels of groups CA0 to CA3 are herein defined as the priority groups; that two bits of information (a total of four types of information) are transmitted according to presence or absence of a signal during two periods PRS0 and PRS1 in the PRS time; and that priority groups assigned to transmission data belonging to the equipment itself are notified. In this case, the priority group CA3 having an access right of the highest priority sends an arbitrary signal appropriate for itself by means of transmission of a signal during the PRS0 period and no signal during the PRS1. The next priority group CA2 sends an arbitrary signal appropriate for itself by means of transmission of a signal during the PRS0 period and no signal during the PRS1 period. The priority group CA1 after the next sends an arbitrary signal appropriate for itself by means of transmission of no signal during the PRS0 period and a signal during the PRS1 period. The priority group CA0 having an access right of the lowest priority sends an arbitrary signal by means of transmission no signal during the PRS0 period and no signal=PRS1.

Figure 30:
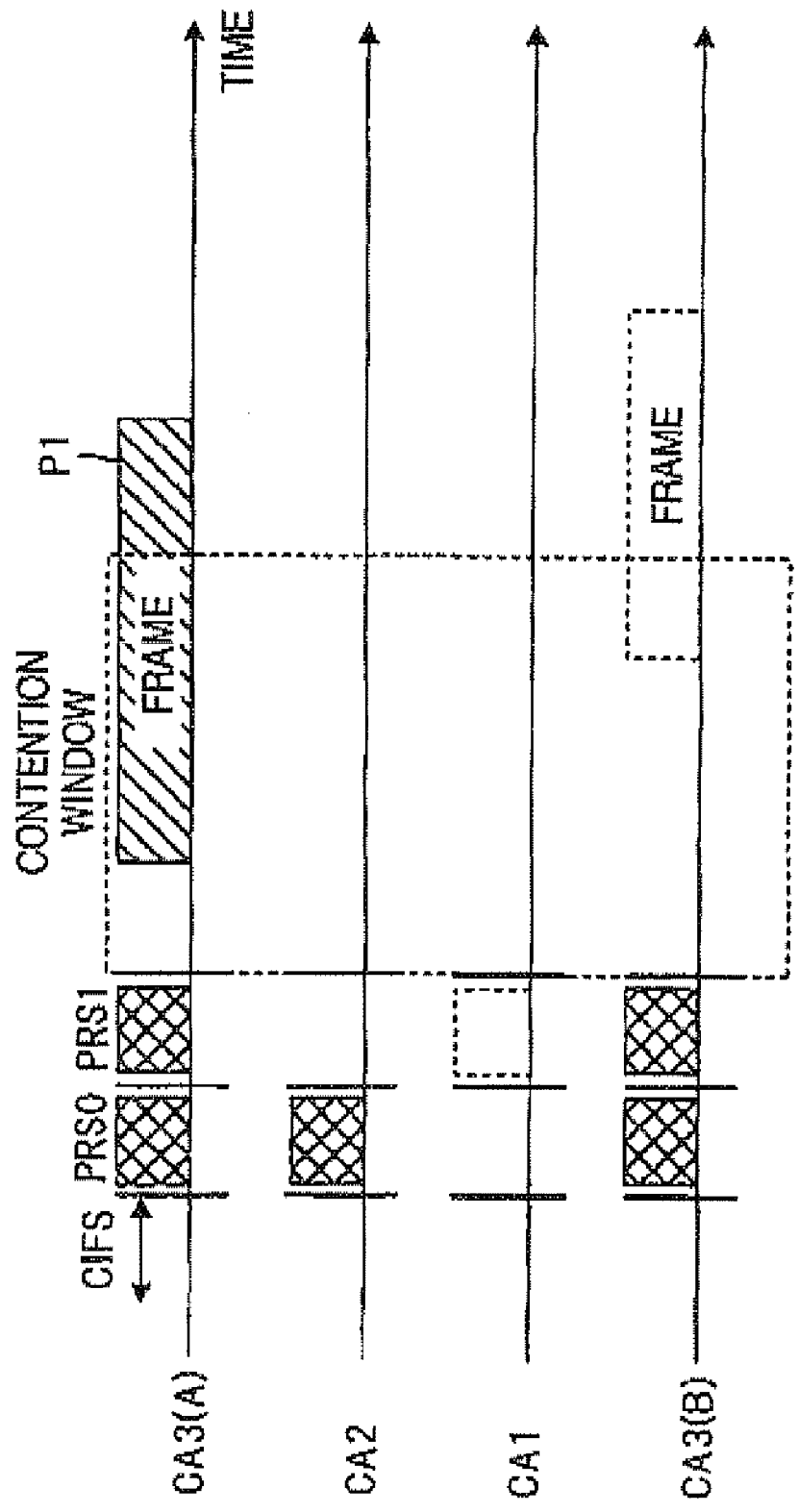
FIG. 30 is a view showing an example of access periods for a plurality of priority groups conforming to the PRS scheme.

FIG. 30 is a view showing example access periods for a plurality of priority groups conforming to the PRS scheme. When a signal is output in the PRS0 period of the PRS time, the access right is narrowed down to the priority group CA3 or CA2. Therefore, the communication equipment belonging to the priority groups CA1 and CA0 not granted the access right output nothing in the subsequent PRS1 period and in the contention window. When a signal is output in the next PRS1 period, the priority group CA3 acquires an access right. Consequently, the communication equipment belonging to the priority group CA2 not granted the access right outputs nothing in a subsequent contention window. In the contention window, pieces of communication equipment belonging to the priority group CA3 granted the access right carry out contention. Pieces of communication equipment belonging to the priority group CA3 are assumed to transmit a frame after elapse of the random backoff time. The illustrated example shows a case where communication equipment CA3(A) among pieces of communication equipment (A) and (B) belonging to the priority group CA3 first output the frame P1, to thus have gained a win over contention. Meanwhile, when first detected a frame from another communication equipment, communication equipment CA3(B) loses contention among the pieces of equipment belonging to the priority group CA3 and does not transmit any frame.

Under the PRS scheme, arbitration of the priority groups is performed, whereby collision among different priority groups can be avoided. When compared with the CSMA/CA scheme, access control can be implemented from one priority group to another within a short period of time that is called the PRS time. However, the chance of occurrence of a collision still exists in the same priority group. Further, since the contention window is used for carrying out arbitration of pieces of communication equipment belonging to the same priority group, a longer arbitration time and waste of a bandwidth are entailed as in the case of the CSMA/CA scheme. Hence, a problem of performance deterioration is encountered.

A yet another method for avoiding contention among accesses from the plurality of pieces of communication equipment is a slot allocation scheme (see; for instance, Patent Document 2). The slot allocation scheme is an access scheme under which a plurality of slots are set; which an access right is allocated on a per-slot basis; numbers are assigned to the respective slots; and only communication equipment or a data stream associated with a number accesses the slot having the number.

Figure 31:
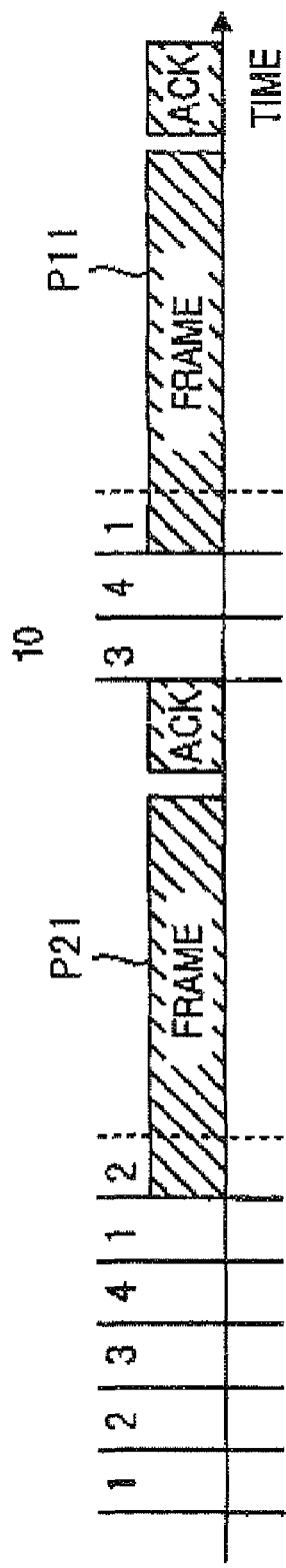
FIG. 31 is a view showing an example of access period achieved when data are transmitted under the slot allocation scheme.

FIG. 31 is a view showing example access period achieved when data are transmitted under the slot allocation scheme. There is shown an example in which four slot numbers from one to four are set and in which pieces of communication equipment assigned to respective slot numbers make accesses. There is illustrated an example in which the slot numbers 1 through 4 are counted and cyclically iterated with time and in which communication equipment transmits a frame in only a slot with a number assigned to the equipment itself. The communication equipment cannot access the slot with the number assigned to the equipment. The illustrated example shows a case where communication equipment with slot number 2 transmits a frame P21 and where communication equipment with slot number 1 subsequently transmits a frame P11. After one communication equipment transmitted a frame and received an acknowledge response from communication equipment at the other end, a slot number for resumption of a slot starts from a slot number subsequent to the slot number of the communication equipment performed transmission ("three" in the illustrated example). Respective pieces of communication equipment are notified of slot numbers by means of beacon frames, whereby the respective pieces of communication equipment ascertain their slot numbers. Alternatively, the respective pieces of communication equipment receive slot IDs stored in headers of frames, thereby ascertaining their slot numbers.

Figure 32:
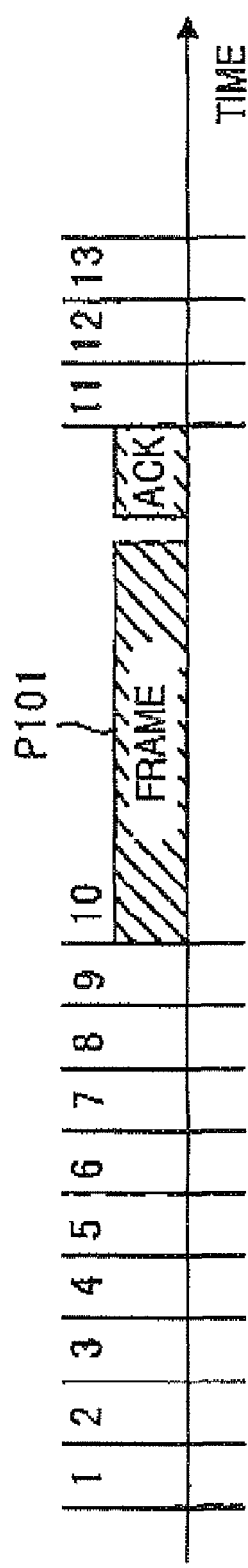
FIG. 32 is a view for describing a problem occurring when a plurality of slot numbers are set under a slot allocation scheme.

Under the slot allocation scheme, occurrence of a collision can be avoided, so long as the slot numbers overlap each other. However, when the number of pieces of communication equipment or data streams to which slots are to be allocated increase, a time for cyclic iteration of respective slots increases with an increase in the number of slots. FIG. 32 is a view for describing a problem occurring when a plurality of slot numbers are set under a slot allocation scheme. In this case, when the communication equipment assigned slot number 10 transmits a frame P101 as illustrated, a time for cyclically iterating slot numbers 1 through 10 is required. Therefore, there is a problem of waste of an unnecessary bandwidth and performance deterioration.

The slot allocation scheme is for acquiring an access right every time the slot numbers 1 through 10 are cyclically iterated one turn and, hence, priorities of transmission cannot be set. If priority control is introduced as it is, control will become complicate. Alternatively, there arises a problem of a chance of occurrence of collision, which would otherwise result from allocation of a plurality of pieces of communication device or data streams to one slot.

Under the related-art PRS scheme and the slot allocation scheme, there are cases where an access right concentrates, in an imbalanced manner, on a specific piece of communication equipment or data when access control is performed according to a priority group or a slot. As a result, untransmitted data that cannot acquire an access right accumulate, or transmission cannot immediately be performed when transmission data of high priority have arisen. Thus, there have been cases where access control appropriate for the circumstance cannot sufficiently be performed.

Citation List

Patent Literature

[PTL1] JP-A-2002-185473
[PTL2] US2007/0064720A

An embodiment to be described below shows, as an example communication method and an example communication device of the present invention, an example configuration of a communication system applied to both a power line communication device using a power line as a transmission channel and a power line communication system equipped with the power line communication device. The present invention is applicable to: a wired network using another wired transmission channel such as a coaxial cable and a LAN (Local Area Network) cable; a wireless network such as a wireless LAN; and a communication device, a communication method, and a communication system using various communication media.

Figure 1:
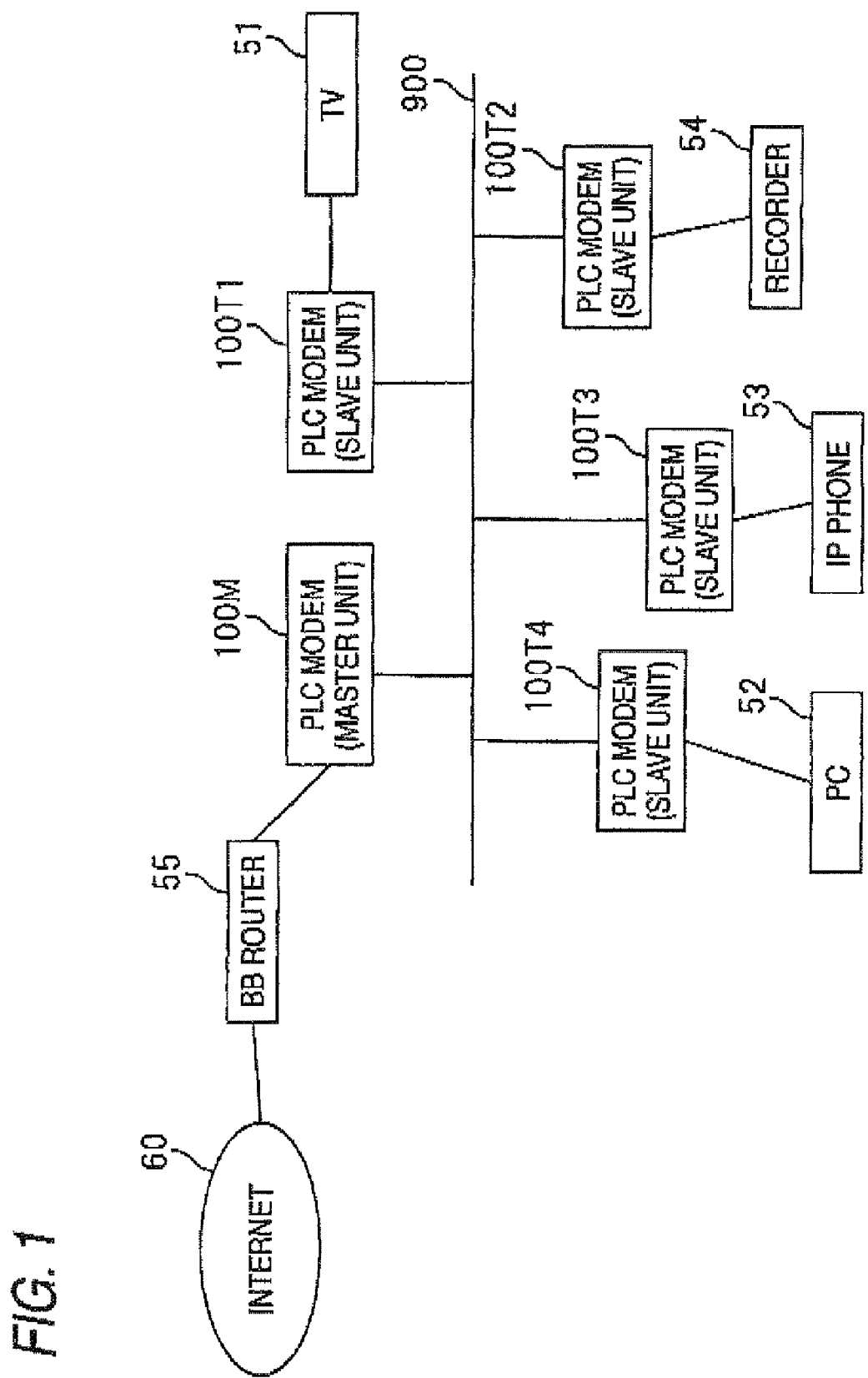
FIG. 1 is a view showing an example of a generation configuration of a power line communication system that implements a communication method and a communication device of the present invention.

FIG. 1 is a view showing an example general configuration of a power line communication system that implements the communication method and the communication device of the present invention. The power line communication system shown in FIG. 1 has a plurality of PLC (Power Line Communication) modems 100M, 100T1, 100T2, 100T3, and 100T4 connected to a power line 900. Although FIG. 1 shows five PLC modems, the number of modems to be connected is arbitrary. The PLC modem 100M works as a master unit and manages connected states (linked states) of the other PLC modems 100T1, . . . , 100T4 that work as slave units.

In the following descriptions, when a reference is made to the master unit and a specific slave unit, the units are described like the PLC modem 100M, 100T1, 100T2, 100T3, and 100T4. When a reference is made to a general slave unit, the unit is described like the PLC modem 100T. When a reference is made to PLC modem limited to neither the master unit nor the slave unit, the unit is described simply as the PLC modem 100.

Although the power line 900 is denoted by a single line in FIG. 1, the power line corresponds to two or more conductor wires in reality. The PLC modem 100 is connected to the conductor wires.

As will be described in detail later, the PLC modem 100 has a LAN modular jack, such as RJ45. The modular jack is connected to a television (TV) set 51, a personal computer (PC) 52, an IP phone 53, a recorder 54, and a broadband router (BB router) 55. The broadband router 55 is connected to the Internet 60.

Figure 2A:
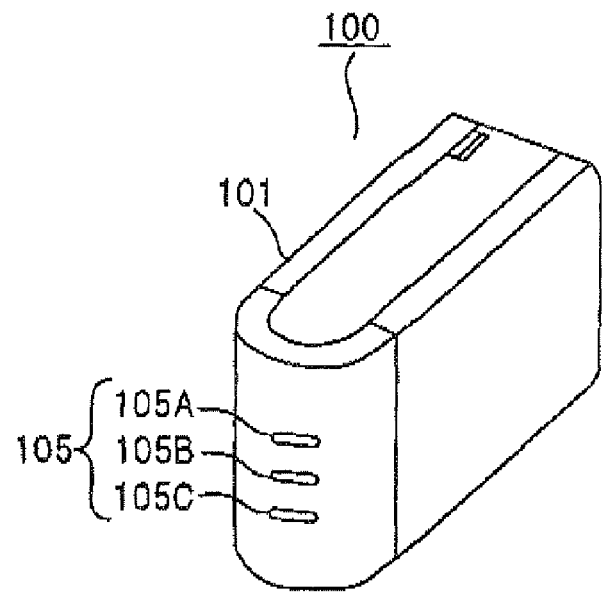
FIGS. 2A to 2C are views showing appearance of a PLC modem.
Figure 2B:
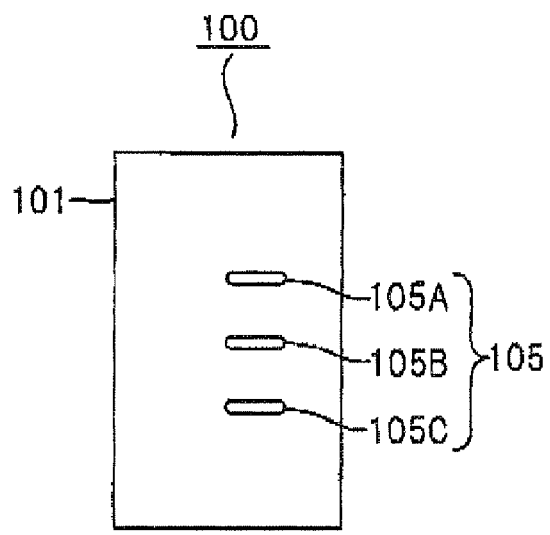
Figure 2C:
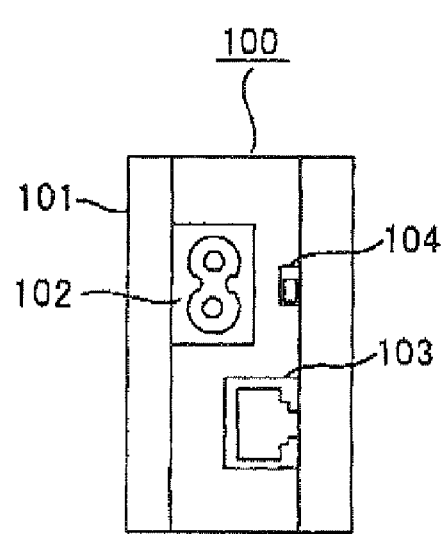

FIGS. 2A to 2C are views showing an external view of the PLC modem 100, FIG. 2A is an external perspective view showing a front surface of the modem; FIG. 2B is a front view of the modem; and FIG. 2C is a rear view of the same. The PLC modem 100 shown in FIGS. 2A to 2C has a body 101. As shown in FIGS. 2A and 2B, a display section 105 consisting of LEDs (Light Emitting Diodes) 105A, 105B, and 105C is provided in a front face of the body 101. As shown in FIG. 2C, a rear face of the body 101 is provided with a power connector 102, a LAN modular jack 103 such as RJ45, and a selecting switch 104 for switching an operation mode, and the like. The power connector 102 is connected to a power cable (not illustrated in FIG. 2), and a LAN cable (not shown in FIG. 2) is connected to the modular jack 103. The PLC modem 100 may also be additionally provided with a Dsub (D-subminiature) connector, and a Dsub cable may be connected to the Dsub connector.

Figure 3:
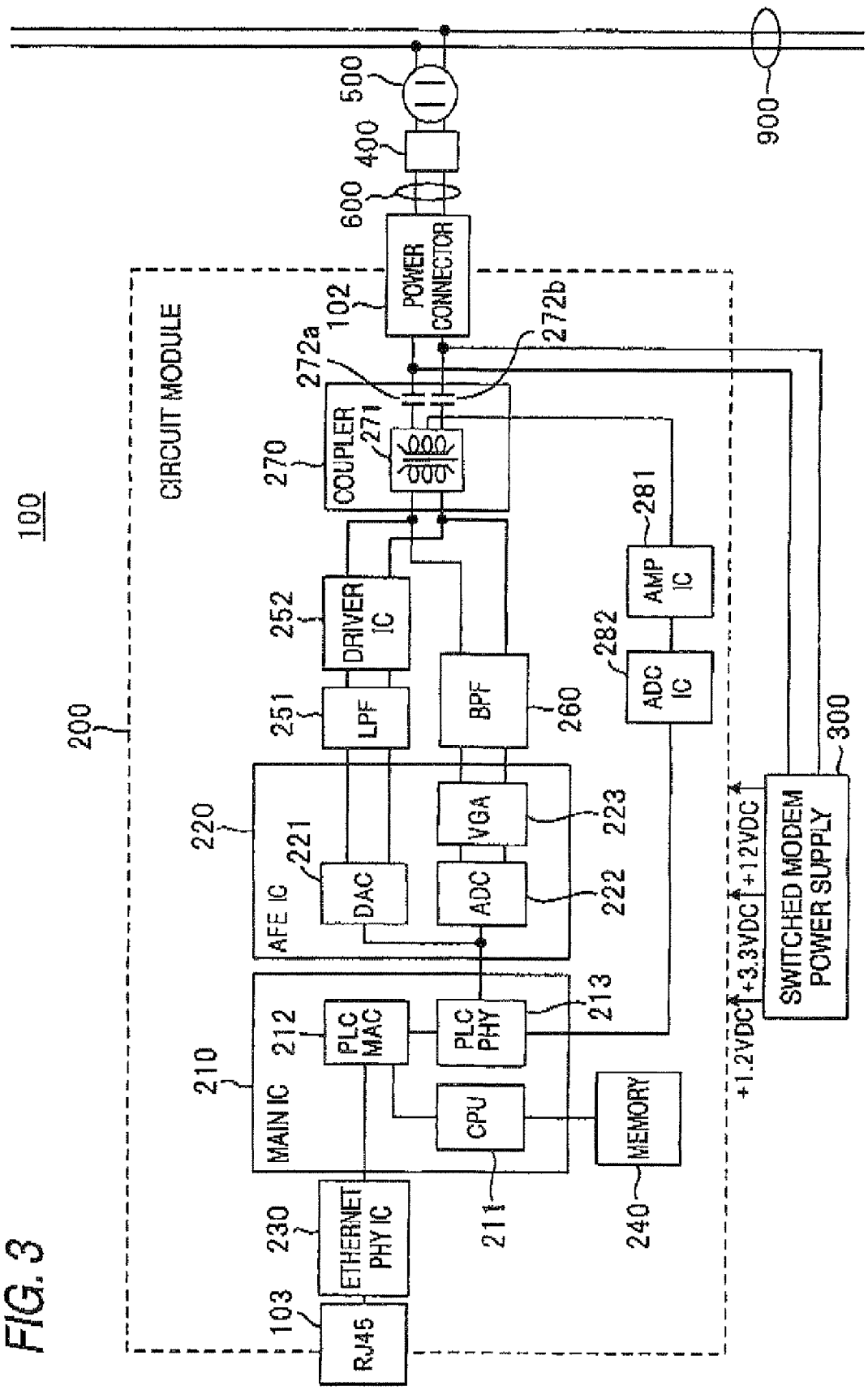
FIG. 3 is a block diagram showing an example of a hardware of the PLC modem.

FIG. 3 is a block diagram showing an example of a hardware of the PLC modem 100. As shown in FIG. 3, the PLC modem 100 has a circuit module 200 and a switched modem power supply 300. The switched modem power supply 300 supplies various voltages (e.g., +1.2 V, +3.3 V, and +12 V) to a circuit modular 200 and is comprised of; for instance, a switching transformer, a DC-DC converter (neither is illustrated).

The circuit module 200 is provided with a main IC (Integrated Circuit) 210, an AFE•IC (Analog Front END•Integrated Circuit) 220, an Ethernet (Registered Trademark) PHY•IC (Physic layer•Integrated Circuit) 230, memory 240, a low-pass filter (LPF) 251, a driver IC 252, a band-pass filter (BPF) 260, and a coupler 270. The switched modem power supply 300 and the coupler 270 are connected to the power connector 102, and further connected to the power line 900 by way of a power cable 600, a power plug 400, and a receptacle 500. The main IC 210 works as a control circuit that performs power line communication.

The main IC 210 is made up of a CPU (Central Processing Unit) 211, a PLC•MAC (Power Line Communication Media•Access Control layer) block 212 and a PLC•PHY (Power Line Communication•Physical layer) block 213. The CPU 211 is equipped with a 32-bit RISC (Reduced Instruction Set Computer) processor. The PLC•MAC block 212 manages a MAC layer (Media Access Control layer) of a send/receive signal. The PLC•PHY block 213 manages a PHY layer (Physical layer) of a send/receive signal. An AFE•IC 220 is made up of a DA converter (DAC: D/A Converter) 221, an AD converter (ADC: A/D Converter) 222, and a variable amplifier (VGA; Variable Gain Amplifier) 223. The coupler 270 is made up of a coil transformer 271 and coupling capacitors 272a and 272b. The CPU 211 controls operation of the entire PLC modem 100 as well as operation of the PLC•MAC block 212 and the PLC•PHY block 213 by utilization of data stored in the memory 240.

The PLC modem 100 performs communication approximately as follows. Data input from the modular jack 103 are sent to the main IC 210 by way of the Ethernet (Registered Trademark) PHY•IC 230 and subjected to digital signal processing, whereby a digital transmission signal is generated. The DA converter (DAC) 221 of the AFE•IC 220 converts the thus-generated digital transmission signal into an analogue signal and outputs the analogue signal to the power line 900 by way of the low-pass filter 251, the driver IC 252, the coupler 270, the power connector 102, the power cable 600, the power plug 400, and the receptacle 500.

A signal received from the power line 900 is sent to the band-pass filter 260 by way of the coupler 270. The thus-sent signal undergoes gain adjustment in the variable amplifier (VGA) 223 of the AFE•IC 220 and is then converted into a digital signal by the AD converter (ADC) 222. The thus-converted digital signal is sent to the main IC 210 and subjected to digital signal processing, to thus be converted into digital data. The thus-converted digital data are output from the modular jack 103 by way of the Ethernet (Registered Trademark) PHY•IC 230.

Example digital signal processing implemented by the main IC 210 is described. The PLC modem 100 performs multicarrier communication using a plurality of subcarriers, such as an OFDM (Orthogonal Frequency Division Multiplexing) scheme. The PLC•PHY block 213 principally performs digital processing for converting transmission data into an OFDM transmission signal and converting an OFDM receive signal into received data.

Figure 4:
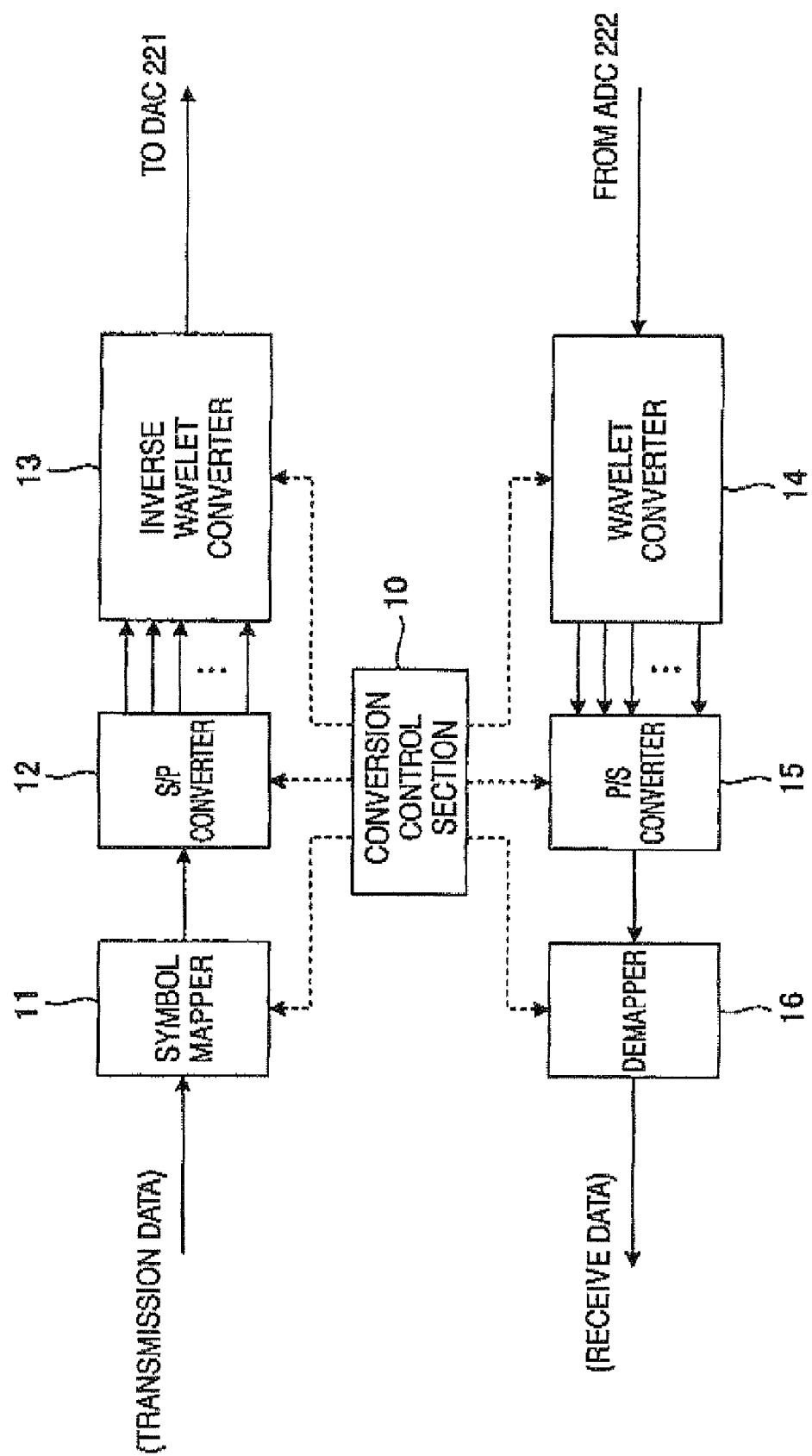
FIG. 4 is a functional block diagram for describing example digital signal processing implemented by a PLC•PHY block.

FIG. 4 is a functional block diagram for describing example digital signal processing implemented by the PLC•PHY block 213, showing a case where OFDM transmission utilizing wavelet transformation is performed. As shown in FIG. 4, the PLC•PHY block 213 has capabilities equivalent to the conversion control section 10, a symbol mapper 11, a serial-parallel converter (S/P converter) 12, an inverse wavelet transformation device 13, a wavelet transformation device 14, a parallel-serial converter (a P/S converter) 15, and a demapper 16.

The symbol mapper 11 converts bit data to be transmitted into symbol data and performs symbol mapping (e.g., PAM modulation) according to respective sets of symbol data. The S/P converter 12 converts mapped serial data into parallel data. The inverse wavelet transformation device 13 subjects parallel data to inverse wavelet transformation, to thus make the data time-based; and generates a sampled-value sequence representing a transmission symbol. The data are sent to the DA converter (DAC) 221 of the AFE•IC 220.

The wavelet transformation device 14 converts received digital data acquired from the AD converter (ADC) 222 of the AFE•IC 220 (a sampled-value sequence sampled at the same sampling rate as that used for transmission) into frequency-based data through discrete wavelet transformation. The P/S converter 15 converts frequency-based parallel data into serial data. The demapper 16 calculates amplitude values of respective subcarriers and validates a received signal, to thus determine received data.

Figure 5:
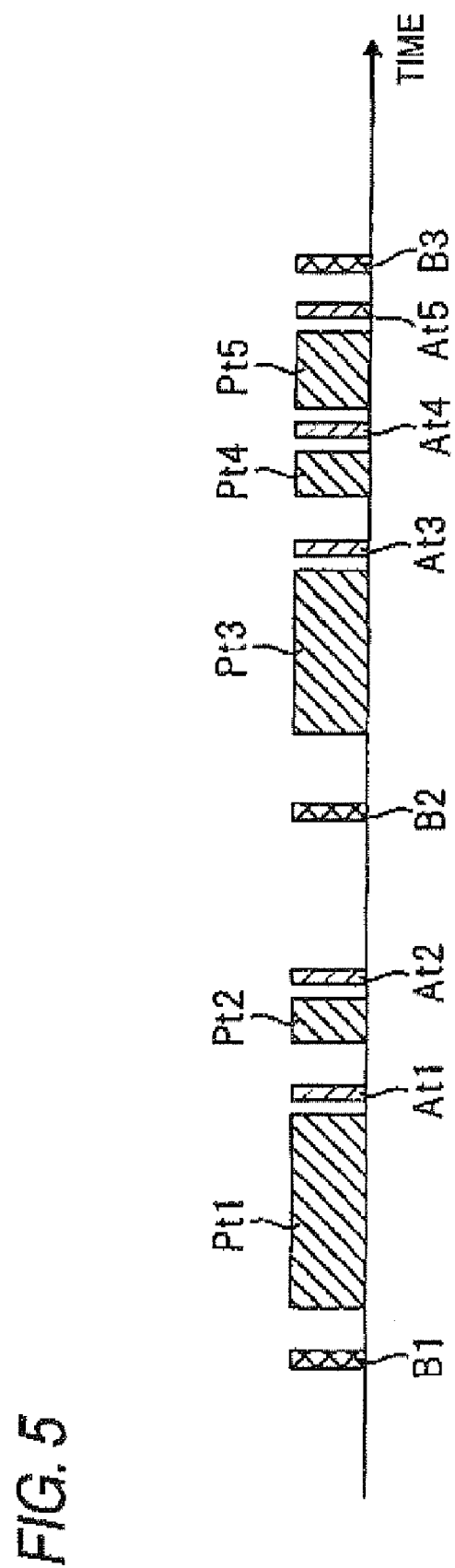
FIG. 5 is a view showing an example of data transmission period in the power line communication system of the present embodiment.

FIG. 5 is a view showing example data transmission period in the power line communication system of the present embodiment. In the power line communication system shown in FIG. 1, in the case of performance of data transmission, the PLC modems 100 working as a source transmit data frames Pt1 to Pt5. The PLC modems 100 working as a destination transmit response frames At1 to At5 when the destination PLC modems 100 can successfully receive the data frames. The PLC modem 100M transmits at given intervals information for managing communication among the PLC modems as broadcast frames (also called "control frames" or "beacon frames") B1, B2, B3, . . . . In the example shown in FIG. 5, the data frames Pt1 to Pt5 are transmitted from the plurality of transmission devices without collision. In order to perform data transmission while avoiding collision, the PLC modems 100 of the embodiment perform access control which will be described below. Processing pertaining access control is implemented by means of control processing of a control section in an individual communication device like the CPU 211 of the PLC modem 100. The CPU 211 of the PLC modem 100 embodies a function of an arbitration information notification section and a function of a data transmission section, thereby performing corresponding processing according to a predetermined program. A control section of a communication device that serves as a master unit (embodied by the CPU 211 of the PLC modem 100M or the like) predominantly performs control of the entire communication system.

[Overview of an Access Control Scheme of this Embodiment]

Figures 6, 7:
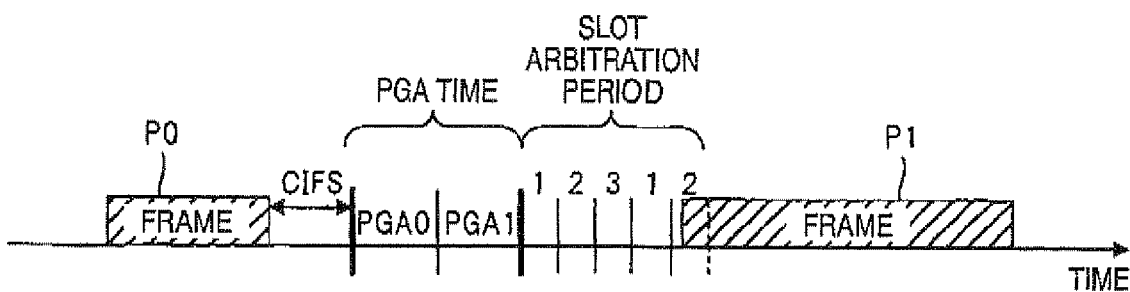
FIG. 6 is a view showing an example of access period achieved when data are transmitted under an access control scheme of the present embodiment.
FIG. 7 is a view showing an example of an arbitration signal for each individual priority group output in a PGA time.

FIG. 6 is a view showing an example of access period achieved when data are transmitted by means of an access control scheme of this embodiment. This embodiment adopts hybrid access-type access control including in combination PGA (Priority Group Arbitration) for conducting arbitration of access rights (transmission rights) of priority groups (PG: Priority Group) into which priorities of data or communication devices for transmitting data are grouped and slot arbitration for conducting arbitration by means of access rights allocated to respective slots. In relation to the priority groups, priority is set to a plurality of groups according to a priority representing the order of priority corresponding to the type of transmission data, and a traffic condition showing the communication volume in a communication medium such as the volume of transmission data, and the like.

When any of the communication devices completes transmission of the frame P0, a PGA time (PGA0 and PGA1) corresponding to a first period is set to conduct arbitration of priority groups after a predetermined CIFS time has been assured. During the PGA time, respective communication devices output arbitration signals as notification signals, whereby arbitration is conducted as to which one of the priority groups acquires an access right, to thus narrow down accessible priority groups. Subsequently, a slot arbitration period corresponding to a second period is set, and arbitration of slot numbers is then conducted in the priority group which has acquired the access right. Respective communication devices in the priority group transmit data at specific periods corresponding to the slot numbers. During the slot arbitration period, the slot numbers are allocated to respective communication devices or respective data streams. A communication device to which a number is allocated accesses during a slot corresponding to the allocated number, and sends a frame P1. An illustrated an example shows a case where a communication device allocated slot number 2 sends the frame P1.

FIG. 7 is a view showing an example of arbitration signals of respective priority groups output during the PGA time. In an example shown herein, four levels of groups PG0 to PG3 are defined as priority groups. Two bits (a total of four types) of information are transmitted as notification signals according to presence or absence of signals during two arbitration periods PGA0 and PGA1 set for the PGA time, thereby notifying priority groups allocated to transmission data of respective communication devices. In this case, the priority group PG3 having an access right of the highest priority sends an arbitrary signal appropriate for itself by means of transmission of a signal during the PGA0 period and a signal during the PGA1. The next priority group PG2 sends an arbitrary signal appropriate for itself by means of transmission of a signal during the PGA0 period and no signal during the PGA1 period. The priority group PG1 after the next sends an arbitrary signal appropriate for itself by means of transmission of no signal during the PGA0 period and a signal during the PGA1 period. The priority group PG0 having an access right of the lowest priority sends an arbitrary signal appropriate for itself by means of transmission of no signal during the PGA0 period and no signal during the PGA1 period. The communication devices send the arbitration signals in accordance with the respective priority groups. The Communication devices belonging to the priority group with a high priority become able to perform transmission during a subsequent slot arbitration period. It is preferable to set one arbitration period (each of the periods PGA0 and PGA1) in the PGA time to a minimum period of time that includes a time required to perform switching between transmission and receipt, an assumed transmission delay time, and a time required to detect a signal and that enables reliable detection of an arbitration signal. Although the arbitrary periods in the PGA time are set in number of two and the four priority groups are set in this embodiment, the arbitrary periods may be modified, such as three arbitration periods and eight priority groups. It is preferable to employ, as the arbitration signal, a signal that can be detected in a short period of time. A signal having the same format as that of a preamble signal is typically used. The preamble signal is added to a head of a frame.

In the embodiment, the priority groups are set based on a priority that corresponds to the priority set in advance according to the type of data. The priority groups can be changed according to a traffic condition of a network, and the like. A priority and a priority group can also be set not on a per-data basis but for each individual communication device (i.e., on a per-terminal basis).

Figure 8A:
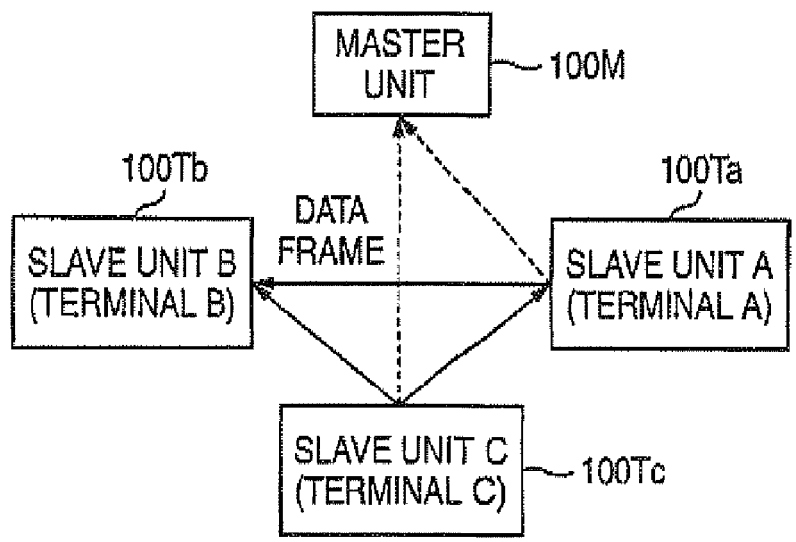
FIGS. 8A and 8B are views showing priority groups and slot allocation procedures of respective communication devices of the embodiment.
Figure 8B:
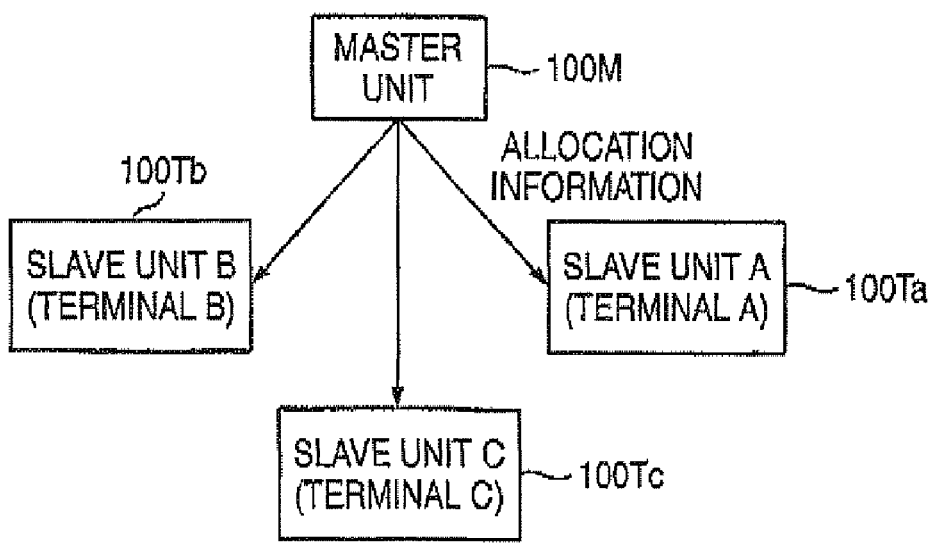

Operation of each of the communication devices in the network using the access control scheme of this embodiment is described. FIGS. 8A and 8B are views showing priority groups and slot allocation procedures of respective communication devices of the embodiment. The PLC modem 100M that is a master unit performs snooping of data frames transmitted among communication devices through the network, to monitor a traffic condition of the entire network. In this case, since the respective communication devices use a single communication medium (the power line 900), even the master unit can check frames transmitted among slave units. For instance, as shown in FIG. 8A, the PLC modem 100M that is the master unit detects a data frame transmitted from the PLC modem 100Ta of a slave unit A (a terminal A) to the PLC modem 100Tb of a slave unit B (a terminal B), a data frame from the PLC modem 100Tc of a slave unit C (a terminal C) to the PLC modem 100Ta of the slave unit A (a terminal A), and a data frame from a PLC modem 100Tc of the slave unit C (the terminal C) to the PLC modem 100Tb of the slave unit B (the terminal B). As shown in FIG. 8B, the PLC modem 100M that is the master unit updates allocation of the priority groups and allocation of the slots based on the traffic condition of the network and periodically notifies the respective slave units A to C (the PLC modems 100Ta to 100Tc) of updated allocation information by means of broadcast control frames (beacon frames, and the like).

FIG. 9 is a view showing an example table for allocating slots to respective priority groups. In the following descriptions, eight levels of priorities 7 to 0 are assumed to be set as priority of transmission data for data streams transmitted by the respective communication devices, and the priorities are assumed to be allocated to four steps of priority groups PG3 to PG0 as in the case of the example shown in FIG. 7. FIG. 9 shows a case of allocation of, in descending sequence of priority, priorities 7 and 6 to the priority group PG3, priorities 5 and 4 to the priority group PG2, priorities 3 and 2 to the priority group PG1, and priorities 1 and 0 to the priority group PG0. Each of the priority groups stores, as the number of cyclic slots showing the number of allocated slots and source information allocated to the slots, a source address for specifying a transmission terminal, a priority of a data stream, and the like.

In the illustrated example, the number of cyclic slots assigned to the priority group PG3 is two. Data having priority 7 of the slave unit A (the terminal A) are allocated to the slot 1, and data having priority 6 of the slave unit B (the terminal B) are allocated to the slot 2. The number of cyclic slots assigned to the priority group PG2 is one. Data having priority 5 of the slave unit C (the terminal C) are allocated to the slot 1. The number of cyclic slots allocated to the priority group PG1 is four. Data having priority 3 of the slave unit A (the terminal A) are allocated to the slot 1, and data are allocated to the other unillustrated slots 2 through 4.

Figure 10:
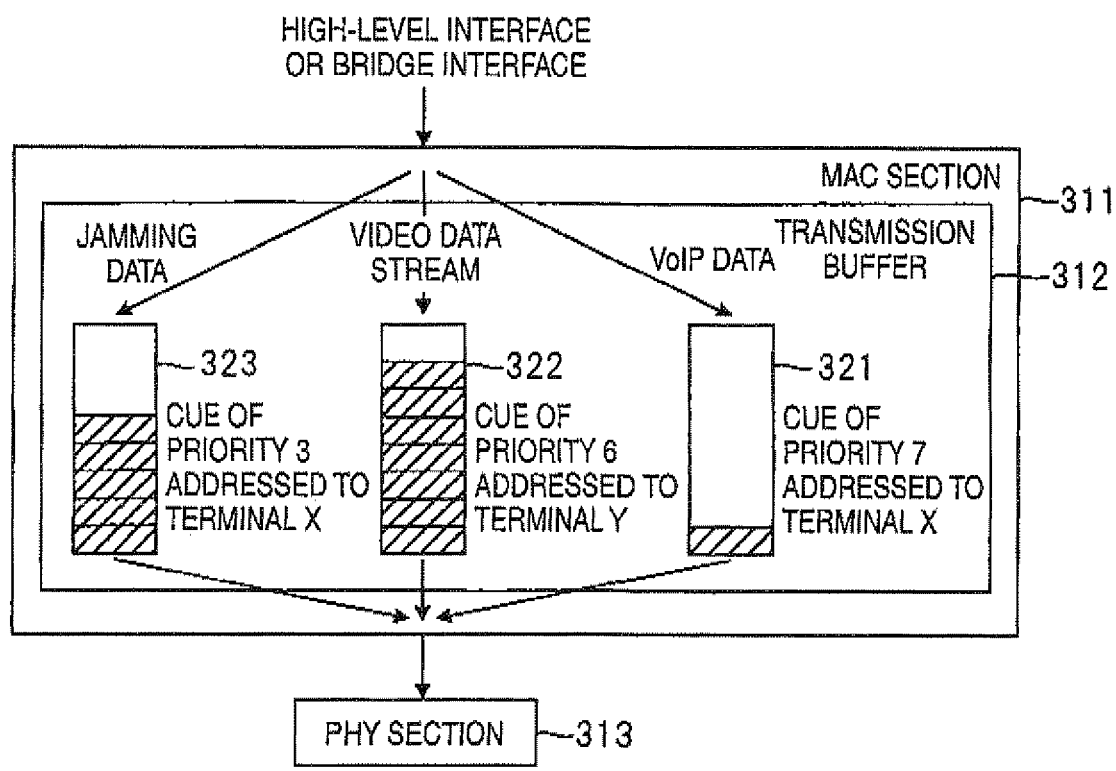
FIG. 10 is a view showing the configuration of a transmission buffer in the communication device of the embodiment.

FIG. 10 is a view showing the configuration of a transmission buffer in the communication device of the embodiment. In each of the communication devices working as the master unit and the slave units, an MAC section 311 has a transmission buffer 312 that holds transmission data. In the example configuration shown in FIG. 3, the MAC section 311 corresponds to the PLC•MAC block 212 of the main IC 210. The transmission buffer 312 is provided with a cue for storing transmission data packets for each individual transmission destination and each type of data (including a priority). In an illustrated example, a first cue 321 is used for a transmission frame of priority 7 addressed to a terminal X that stores VoIP (Voice over Internet Protocol). A second cue 322 is used for a transmission frame of priority 6 addressed to a terminal Y that stores video stream data. A third cue 323 is used for a transmission frame of priority 3 addressed to the terminal X that stores jamming data. Jamming data correspond to data having a low priority that does not require immediacy, such as data accessed by the Internet browser like an hypertext transfer protocol (http).

A transmission data stream is transmitted as a packet from a high-level interface or another bridge interface in a communication device and input to the MAC section 311. In an example configuration shown in FIG. 3, the Ethernet (Registered Trademark) PHY•IC 230 is a bridge interface that exchanges data between the Ethernet (Registered Trademark) and the PLC. A packet of transmission data is stored in a cue of the transmission buffer 312 of the MAC section 311. Data in the cue acquired an access right are output to a PHY section 313 on a per-transmission-frame basis and transmitted as a data frame to the communication medium. One frame is transmitted from one cue at this time when the data are transmitted to the communication medium. In the example configuration shown in FIG. 3, the PHY section 313 corresponds to the PLC•PHY block 213. A cue in the transmission buffer 312 is automatically generated in response to an input of transmission data. An ID for identification is previously appended to each of the cues. Once cues have been generated, the cues are held for a predetermined period of time even after having become empty of transmission data, so as to be able to store data when data of the same type are again input.

The MAC section 311 identifies a transmission destination and a type of transmission data according to header information, and the like, about a packet, and sorts and stores the transmission data into cues. An application or network manager that handles the transmission data appropriately sets priorities in advance according to a data type. For instance, in order to prevent occurrence of a delay, priorities are set to high levels in connection with real-time audio data, such as VoIP data used in an IP phone. Further, since the influence of a delay on web access data, such as an http, is small, the priority is set to a low level. Priority 3 is set as a default for data whose priority is unknown.

[A Detailed Example of Access Control Scheme of this Embodiment]

Figure 11:
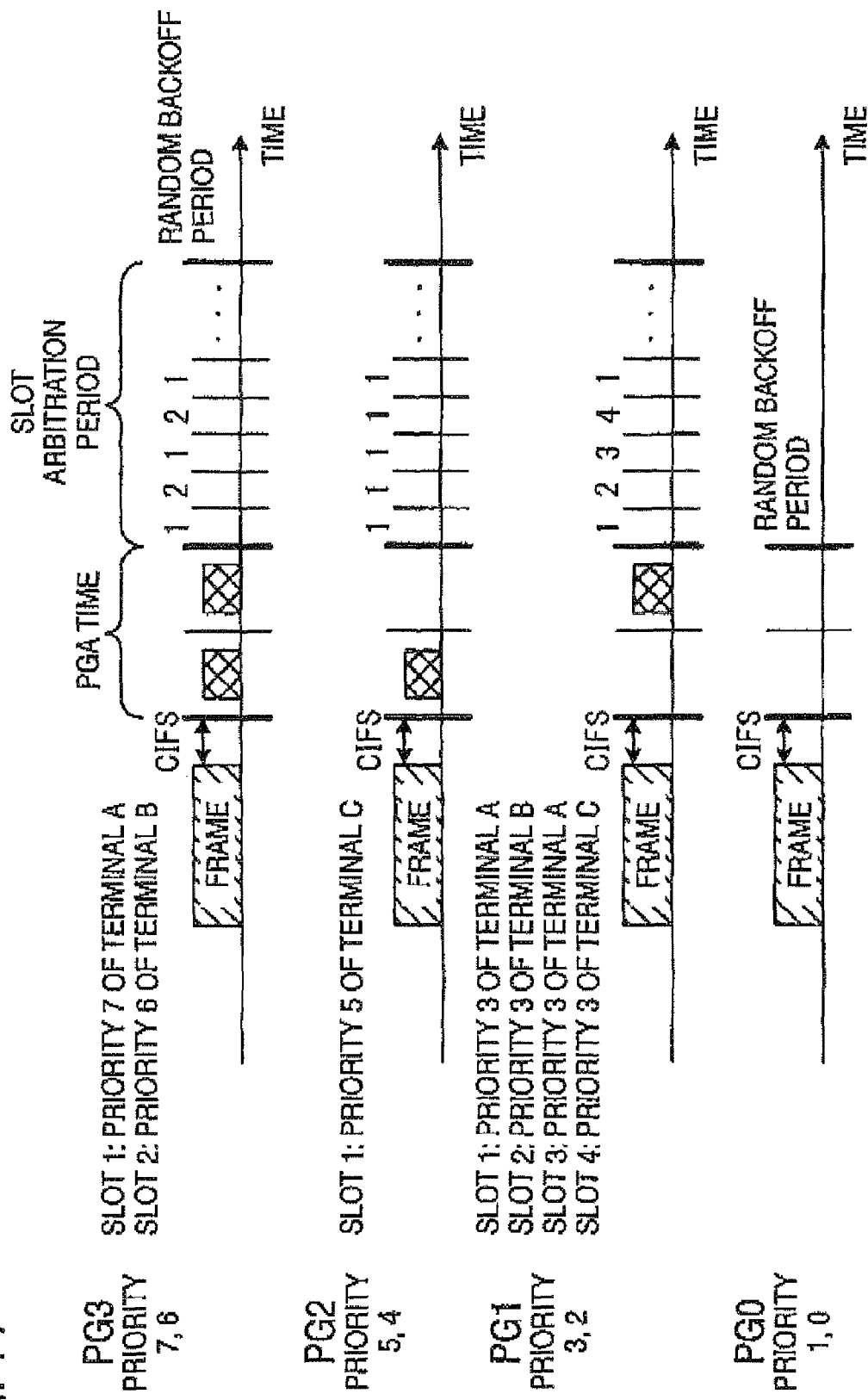
FIG. 11 is a view showing an example of access period for each individual priority group in the embodiment.

FIG. 11 is a view showing an example of access period for each individual priority group in the embodiment. FIG. 11 shows a case where there are set priority groups and slots corresponding to allocation information shown in FIG. 9. The terminal A (priority 7) and the terminal B (priority 6) each having data belonging to the priority group PG3 output arbitration signals in both arbitration periods PGA0 and PGA1 in the PGA time respectively. When the priority group PG3 has acquired an access right, two slots 1 and 2 are cyclically iterated in the slot arbitration period, and a transmission frame is output during the period of a slot allocated to transmission data of an individual communication device. When a signal already transmitted from another communication device is not detected, data are transmitted at a period of a slot ID allocated to the transmission data of the communication device. In the case of an illustrated example, the slot 1 is allocated to transmission data of the terminal A, the terminal A first outputs a transmission frame having priority 7 during the period of the slot 1. When no data frame is output during the slot arbitration period, a subsequent time is taken as a contention period including a random backoff period corresponding to a third period. Respective communication devices transmit data frames after elapse of a random backoff time to accomplish contention. Only the communication device which wins the contention can make access.

The terminal C (priority 5) having data belonging to the priority group PG2 outputs an arbitration signal only during the arbitration period PGA0 in the PGA time. When the priority group PG2 has acquired an access right, only the period of the slot 1 is iterated during the slot arbitration period, and the terminal C allocated the slot 1 outputs a transmission frame. When no data frame is output even during the slot arbitration period, arbitration is subsequently conducted during the random backoff period.

The terminal A (priority 3), the terminal B (priority 3), and the terminal C (priority 3) each having data belonging to the priority group PG1 output arbitration signals only during the arbitration period PGA1 in the PGA time. When the priority group PG1 acquires an access right, four slots 1 through 4 are cyclically iterated during a slot arbitration period, and an individual communication device outputs a transmission frame during the period of a slot allocated to transmission data of the communication device. In the case of the illustrated example, since the slot 1 is allocated to transmission data of the terminal A, the terminal A first outputs a transmission frame having priority 3 during the period of the slot 1. When no data frame is output even during the slot arbitration period, arbitration is subsequently conducted during the random backoff period.

In the illustrated example, slots are not allocated in the priority group PG0, and performance of slot arbitration is avoided. When the terminals of the priority groups PG3 to PG1 do not output any arbitration signals in the PGA time and when the priority group PG0 has acquired an access right, a random backoff period is immediately set without setting a slot arbitration period. Respective communication devices transmit data frames after elapse of a random backoff time, to accomplish contention. Only the communication device which wins the contention is allowed to make access. Slots may also be allocated in the priority group PG0 in the same fashion as mentioned above, to conduct the slot arbitration.

FIG. 12 is a flowchart showing operation procedures of each of the communication devices in the access control scheme of the embodiment. Operation to be described below is basic operation processing of access control carried out by the communication device working as a master unit and the communication devices working as slave units. Completion of transmission/receipt of a frame is detected as a result of completion of an acknowledge frame transmitted from any one of the communication devices (step S11). After the device has stayed in a standby condition during the CIFS time in order to synchronize the communication devices (step S12), it is determined whether or not a transmission frame is stored in a cue of a transmission buffer of the communication device (step S13). When the transmission frame is determined to be stored in the cue, the previously-described PGA operation is performed, thereby determining a priority group granted an access right (step S14).

It is also determined whether or not there is a cue corresponding to the priority group determined through PGA (step S15). When there is a cue of the corresponding priority group, cyclic iteration of slots for counting slot numbers allocated to the priority group is commenced (step S16). In the example shown in FIG. 11, the priority group PG3 acquires an access right in the PGA time, and slots having slot numbers 1 and 2 are cyclically iterated during the slot arbitration period. When it is determined whether or not there is a transmission frame corresponding to the current slot number (step S17) and when there is a transmission frame having the corresponding slot number, the communication device has an access right through current slot arbitration and, hence, starts transmitting a data frame (step S18). Processing of the flowchart is completed.

In the meantime, when a transmission frame corresponding to the current slot number is determined not to be present in step S17, it is determined whether or not a data frame of another communication device is detected (step S19). When a data frame of another communication device is detected, the other communication device is determined to have acquired an access right through slot arbitration and transmitted the data frame, and hence processing is completed without performance of transmission. Meanwhile, when a data frame of another communication device is not detected, the slot number is incremented (step S20), and it is determined whether or not the slot arbitration period is completed (step S21). When the slot arbitration period is not completed, processing returns to step S17, and processing pertaining to steps S17 through S21 is similarly repeated. When the slot arbitration period is completed in step S21, a contention period including a random backoff period is started (step S22).

When no transmission frame is determined to be stored in a cue in step S13, the communication device stays in a standby condition in the PGA time (step S23), and cyclic iteration of slots is commenced in the same manner as in step S16 (step S24). The case where the corresponding priority group is determined not to have a cue in step S15 is a case where the priority group to which transmission data of the communication device belong has failed to acquire an access right through PGA. Likewise, cyclic iteration of slots is commenced in step S24. It is subsequently determined whether or not a data frame of another communication device is detected (step S25). When a data frame of another communication device is detected, any of the other communication devices is considered to have acquired an access right through slot arbitration and transmitted the data frame; hence, processing is completed without performance of transmission. Meanwhile, when a data frame of another communication device is not detected, a slot number is incremented (step S26). It is determined whether or not the slot arbitration period is completed (step S27), and processing pertaining to steps S25 to S27 is repeated until the slot arbitration period is completed. When the slot arbitration period is completed in step S27, a contention period including a random backoff period is commenced in step S22.

As mentioned above, only the priority group which has acquired an access right through PGA conducts slot arbitration, and a communication device allocated to the period of the corresponding slot number transmits a data frame. When a data frame of another communication device is detected, processing is completed. When the slot arbitration period is completed, the contention period including a random backoff period is started. The communication devices which have failed to acquire an access right through PGA stay in a standby condition during the slot arbitration period. When a data frame of another communication device is detected, processing is completed. When the slot arbitration period is completed, the contention period including the random backoff period is started.

When a transmission frame is not stored in a cue of a transmission buffer in access control processing, PGA is basically assumed not to be conducted. In a case where there is a cue having a high priority, such as VoIP data, PGA for that cue may also be conducted even when a transmission frame is not available at this point in time. When a transmission frame is input to a cue in the middle of the PGA time or the slot arbitration period, transmission data having a high priority can immediately be transmitted.

When any of the communication devices transmits a data frame, processing of the flowchart shown in FIG. 12 is resumed. After completion of transmission/receipt of the frame, processing returns to PGA after elapse of the CIFS time. Incidentally, a contention period may also be commenced without setting the slot arbitration period in connection with a specific priority group as in the case of the priority group PG0 shown in FIG. 11. Moreover, processing may also return to PGA without setting a contention period after the slot arbitration period.

In the embodiment, the priority groups are set, and both PGA and slot arbitration are used in combination, whereby arbitration of access contention can be performed within a comparatively short period of time even when the number of communication devices and data streams is increased. Further, occurrence of collision between communication devices having the same priority can be avoided by means of slot arbitration. Therefore, access control appropriate to a priority is possible, and it is possible to shorten the time required for access control and eliminate an unnecessary bandwidth. It is thereby possible to prevent performance deterioration and enhancement of data transmission efficiency.

[Update Processing (Registration and Release) of Slot Allocation]

Several examples of processing for allocating slots to priority groups of respective communication terminals are now described.

Figures 13A, 13B:
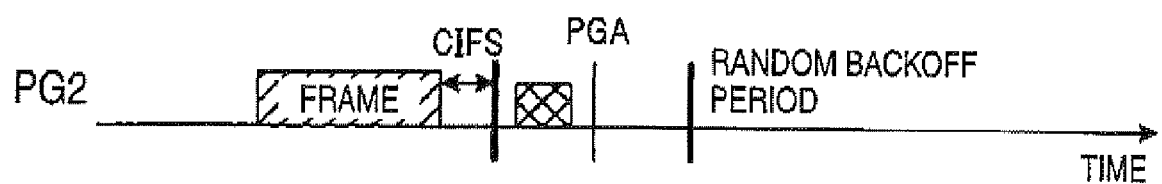
FIGS. 13A and 13B are views showing processing performed when slots are not allocated to any of priority groups.

FIGS. 13A and 13B are views showing processing performed when slots are not allocated to any of priority groups. FIG. 13A shows an example of a slot allocation table, and FIG. 13B shows an access period of the terminal. Examples shown in FIGS. 13A and 13B show a case where a slot is not allocated to the priority group PG2 and where the priority group PG2 has acquired an access right through PGA.

In an initial state of a network or when a data frame is not transmitted to a certain priority group for a predetermined period of time, the priority group remains a state in which a slot is not allocated. When an arbitration signal is output during the arbitration period PGA0 in the PGA time in a state where a slot is not registered in the priority group PG2 and when the priority group PG2 acquires an access right through PGA as shown in FIGS. 13A and 13B, a random backoff period is started without transition to the slot arbitration period. During the random backoff period, respective communication devices having transmission data belonging to the priority group PG2 transmit data frames after elapse of a random backoff time. Only the communication device which wins the contention becomes able to make access. In the initial state of the network, registration of a first slot allocation table is performed depending on a result of access made during the random backoff period.

Figure 14A:
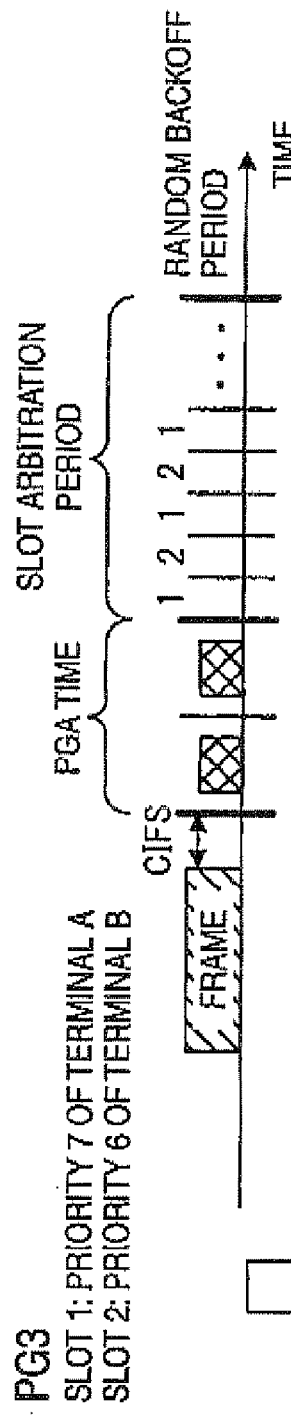
FIGS. 14A to 14C are views showing an example of processing for updating slot allocation information about each individual priority group.
Figure 14B:
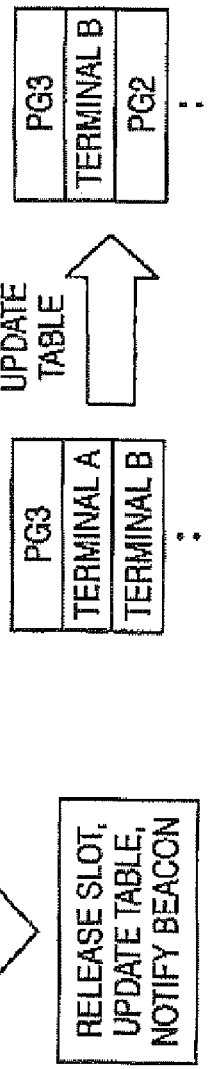
Figure 14C:
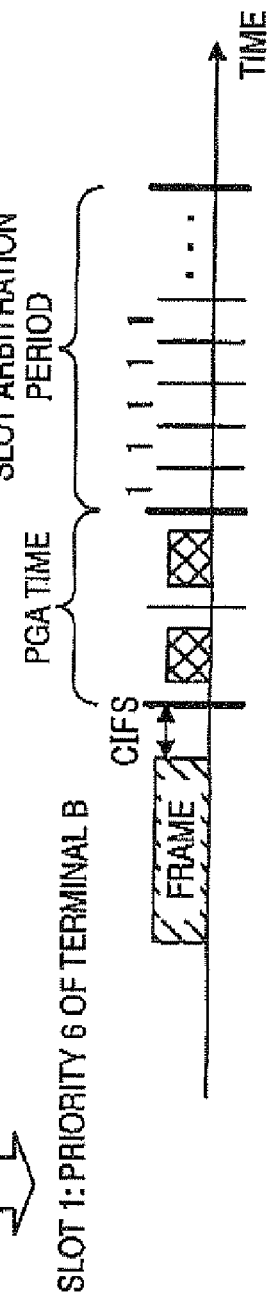

FIGS. 14A to 14C are views showing an example of processing for updating slot allocation information about each individual priority group. In relation to slot allocation of each priority group, aging processing is adopted. Namely, when data has not been transmitted by a communication device or in a data stream for a predetermined period, a slot allocated to the communication device or the data stream is released. The example shown in FIGS. 14A and 14B shows a case where the terminal A does not transmit a data frame at the slot 1 of the slot arbitration period for a predetermined period of time while slots are allocated to the terminals A and B in the priority group PG3 as shown in FIG. 14A. In this case, the aging of the terminal A is activated; release of the slot and updating of the slot allocation table is performed as shown in FIG. 14B; and updated allocation information is notified by means of beacon frames for broadcast. After updating of the slot allocation table, only data of priority 6 belonging to the terminal B are allocated to the slot 1 in the priority group PG3. When the priority group PG3 has acquired an access right in the PGA time as shown in FIG. 14C, only the period of the slot 1 is iterated during the slot arbitration period.

FIG. 15 is a sequence chart showing an example of processing for updating slot allocation information about each individual priority group. The communication device working as a master unit transmits allocation information to the terminals A to C working as the slave units A to C, of, by means of beacon frames. Each of the beacon frames includes a slot allocation table. When a data frame is transmitted from; for instance, the terminal B to the terminal C, the master unit snoops a header of the data frame, thereby checking whether or not the slave unit is properly transmitting the data frame by means of a source address, priority information, and others in the header. In an illustrated example, transmission of data from the terminal B to the terminal C is detected. When detection of a data frame from the terminal A allocated to the slot 1 of the priority group PG3 is not detected for a predetermined period, the master unit performs a release of the allocated slot and updating of the slot allocation table by means of aging processing, thereby transmitting updated allocation information to the terminals A to C by beacon frames.

As mentioned above, when a change arises in the traffic condition, such as a case where any of terminals to which a slot is allocated does not perform transmission of the data frame for a predetermined period once data streams of the terminals have been allocated to slots for each priority group, the slot allocation can be dynamically updated for each individual priority group. Therefore, the traffic condition of the network can be checked by snooping the header of the data frame transmitted through the network. It is possible to manage entry or exit of the terminals working as slave units in or from the network and priority according to the traffic condition achieved at that time.

Processing to be performed at the time of new entry of a terminal working as a slave unit is now described. When a communication device working as a slave unit attempts to newly enter a network to establish communication, the communication device that newly enters basically transmits a data frame in a random backoff period. In the previously-described example, the random backoff period is set when the priority group PG0 has acquired an access right and when another communication device does not transmit any data frame in the PGA time or during the slot arbitration period. The communication device working as a master unit snoops a source address and priority information in a header of a data frame, thereby ascertaining presence of a terminal that newly establishes communication. The master unit newly allocates the terminal and its priority information to the slot allocation tables of the respective priority groups, thereby updating allocation information. The master unit then transmits the thus-updated allocation information to the terminals working as slave units by means of beacon frames.

Figure 16A:
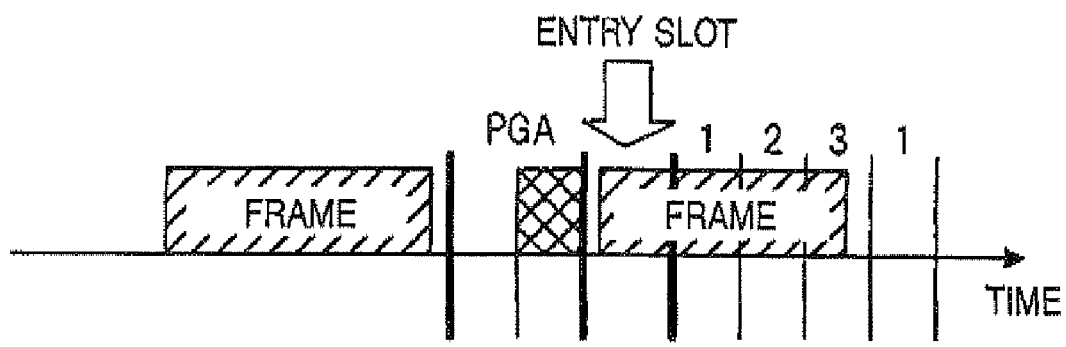
FIGS. 16A and 16B are views showing an example of processing to be performed when a terminal working as a slave unit is caused to newly enter a network.
Figure 16B:
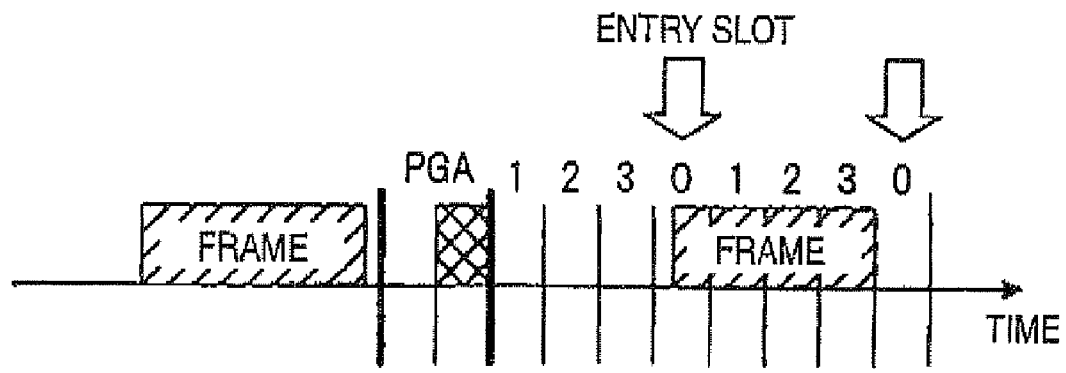

There is now described an example of processing to be performed at the time of new entry of a terminal working as a slave unit. FIGS. 16A and 16B are views showing an example of processing to be performed when a terminal working as a slave unit is caused to newly enter a network. FIG. 16A shows a first entry processing method, and FIG. 16B shows a second entry processing method. Under the first entry processing method shown in FIG. 16A, an entry slot is provided between a PGA time and a slot arbitration period. A new terminal is caused to access the entry slot with a probability of uniform random number. Under the second entry processing method shown in FIG. 16B, a slot 0 corresponding to an entry slot is set in the slot arbitration period, and the new terminal is caused to access the slot 0 with a probability of uniform random number. When access is made with a probability of uniform random number, it is better to employ a method for making access with a probability determined by a priority, a method for making access with a probability corresponding to the number of cyclic slots allocated to each of the priority groups, and the like. In the case of use of a priority, if a new terminal has; for instance, priority 7, the terminal will be assumed to transmit a data frame with one-half probability when newly entering a network. In the case of use of the number of cyclic slots, if the number of cyclic slots of the priority group PG3 is; for instance, three, a new terminal will be assumed to transmit a data frame with one-third probability when newly entering a network.

Figure 17:
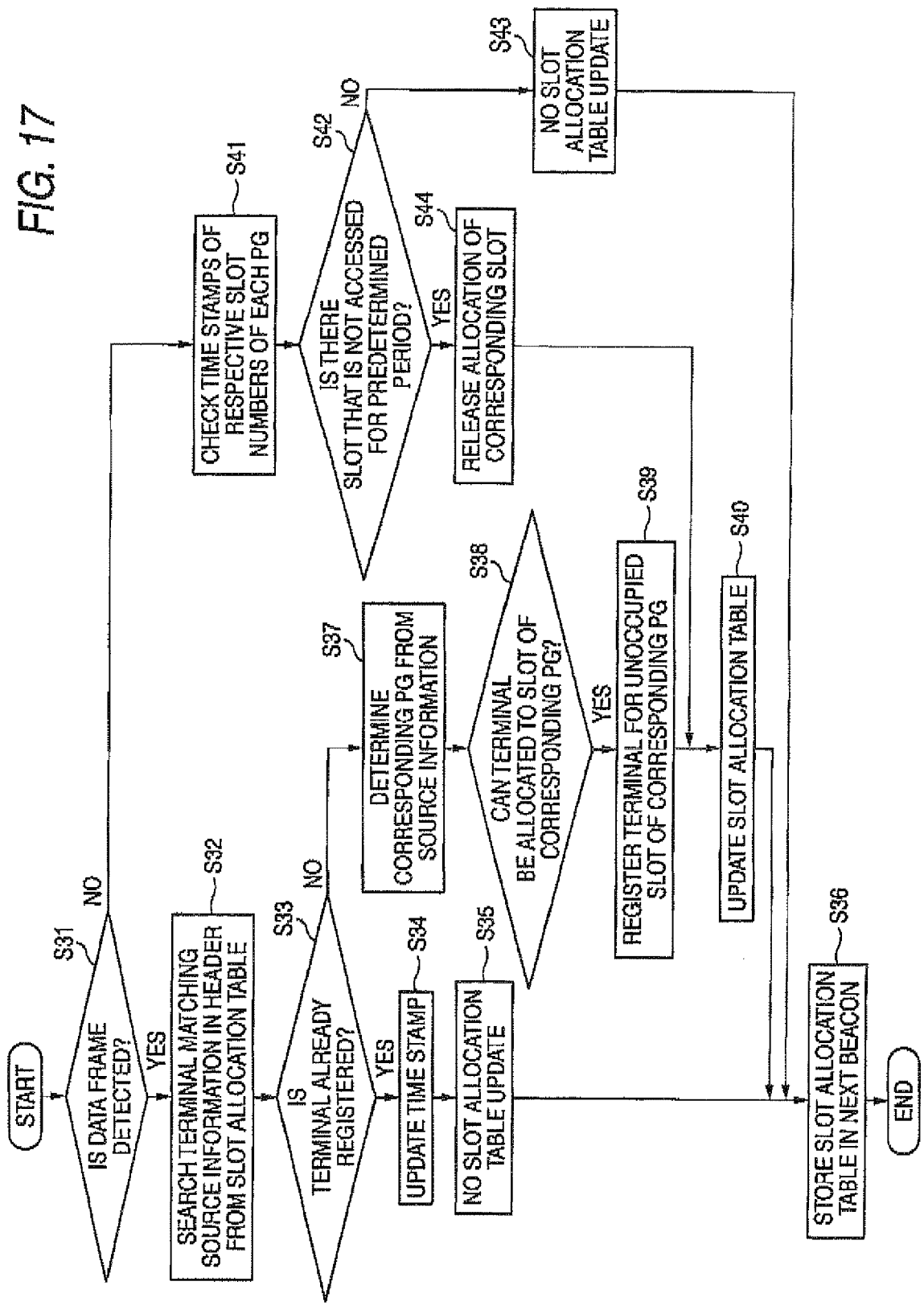
FIG. 17 is a flowchart showing operation procedures pertaining to processing for updating slot allocation information about a communication device working as a master unit.

FIG. 17 is a flowchart showing operation procedures pertaining to processing for updating slot allocation information about a communication device working as a master unit. Processing pertaining to the flowchart is carded out for each of comparatively short predetermined periods. The communication device working as a master unit detects whether or not a data frame transmitted from a slave unit or from itself has been detected (step S31). A determination is likewise made, at this time, before and after the master unit itself transmits a data frame. When a data frame is detected, reference is made to the slot allocation table, thereby searching a terminal coinciding with source information contained in a header of the data frame (step S32). Source information includes a source address (a source ID), a priority, a slot ID (a slot number), a default PG value, a cue ID, and the like. The information is included in the header.

It is then determined whether or not the source address and priority of the data frame are already registered in the slot allocation table (step S33). When the source address and the priority are already registered, a time stamp of a slot number of a corresponding priority group is updated (step S34), and an update of the slot allocation table is taken as being unnecessary (step S35). The slot allocation table is stored in a next beacon frame (step S36). Time information, such as information showing that access is made to a slot number "m" of a priority group PGn at time xx, is recorded in advance in a time stamp of an individual slot number. The time information is utilized for the aging process of the slot allocation.

In the meantime, when the source address and priority of the data frame are not already registered in the slot allocation table, a corresponding priority group is determined based on the source information (step S37), and it is determined whether or not a terminal can be allocated to a slot of the corresponding priority group (step S38). For instance, in the case of priority 7, the priority group PG3 is determined. In the case of priority 3, the priority group PG1 is determined. According to whether or not the number of cyclic slots of the corresponding priority group is smaller than the maximum number, it is determined whether or not the terminal can be allocated. When the terminal can be allocated to the slot, a source address and priority of a data stream pertaining to the terminal allocated to an unoccupied slot in the corresponding priority group are registered (step S39). The slot allocation table is then updated (step S40). Processing proceeds to step S36, where an updated slot allocation table is stored in the next beacon frame.

When the terminal cannot be allocated to a slot of the corresponding priority group in step S38 and when the data frame is not detected in step S31, a time stamp of each of slot numbers of respective priority groups is checked (step S41), thereby determining whether or not there is a slot that has not been accessed for a predetermined period of time (step S42). When a slot that has not been accessed for a predetermined period of time is not found, the slot allocation table is taken as not being updated (step S43). Processing proceeds to step S36, where the slot allocation table is stored in the next beacon frame. In the meantime, when a slot that has not been accessed for a predetermined period of time is found, a corresponding slot is unallocated (step S44). Processing proceeds to step S40, where the slot allocation table is stored. Through processing pertaining to steps S41 to S44, the aging process of the slot allocation is carried out. In step S36, the updated slot allocation table is stored in the next beacon frame.

On the occasion of a determination as to whether or not the terminal can be allocated to the slot in step S38, if the terminal can be allocated to the slot by releasing another slot, the another slot may also be released and registered. Alternatively, at the time of release of a slot in step S44, the priority level of the priority group may also be lowered by one rather than the slot being fully released. If the low-level priority group has an unoccupied slot, the terminal may also be re-registered in connection with the unoccupied slot.

Through such slot allocation information update processing, the master unit dynamically allocates a slot to each of the priority groups and releases a slot in accordance with presence or absence of a data frame, whereby updating of slot allocation information becomes possible. The thus-updated slot allocation table is periodically transmitted to the communication devices working as the slave units by means of the beacon frames. The updated slot allocation table may also be notified to the slave units by means of control frames other than the beacon frames.

Figures 18A, 18B:
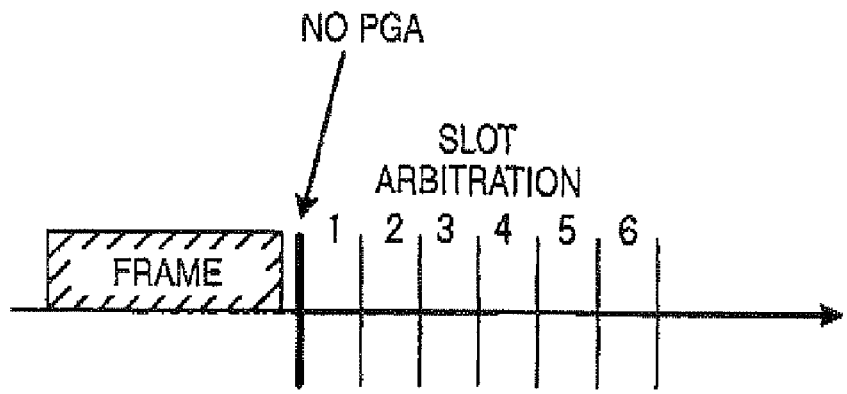
FIGS. 18A and 18B are views showing another example of a slot allocation table for each of the priority groups.

FIGS. 18A and 18B are views showing another example of a slot allocation table for each of the priority groups. The example shown in FIGS. 18A and 18B is an example modification of the slot allocation table shown in FIG. 9 and is additionally provided with an information field for storing PGA presence/absence information as shown in FIG. 18A. When data belonging to a higher priority group do not need to be given preference through PGA, PGA presence/absence information is set to zero. For instance, this is effective for a case where all data streams registered in the slot allocation table have the same priority, such as those shown in the illustrated example, and where a total number of registered slots are small. When PGA presence/absence information is set to zero, a slot arbitration period is immediately commenced as shown in FIG. 18B by elimination of the PGA time. A time required for access control can thereby be shortened, and data transmission efficiency can be enhanced. When all registered slots have the same priority and when grouping is not required, an unnecessary PGA time can be eliminated.

[Change of the Priority Groups Appropriate to a Traffic Condition]

Figure 19A:
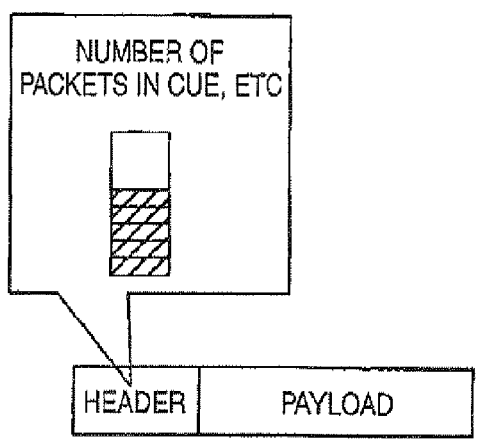
FIGS. 19A and 19B are views for describing processing for updating slot allocation information appropriate to a traffic condition.
Figure 19B:
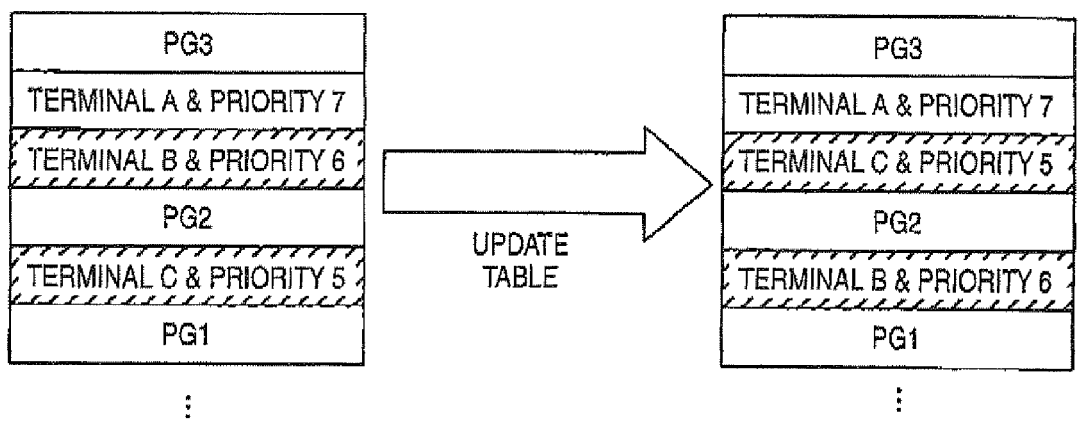

FIGS. 19A and 19B are views for describing processing for updating slot allocation information appropriate to a traffic condition. As mentioned previously, the communication device working as the master unit snoops the data frame transmitted between the communication devices in the network, thereby monitoring the traffic condition of the network. For instance, as shown in FIG. 19A, transmission buffer volume information about the volume of data frames which is not transmitted yet and stored in a transmission device, such as the number of packets still remaining in a cue, is stored in the header of the data frame. The communication device working as the master unit detects the data frame, acquires the transmission buffer volume information, and grasps the volume of transmission data preserved in the respective devices.

For instance, in relation to the state of the slot allocation table on the left side of FIG. 19B, when the volume of transmission data in the terminal B belonging to the priority group PG3 is small and when a large volume of data are stored in a transmission buffer of the terminal C belonging to the priority group PG2, the slot allocation table is updated as illustrated on the right side of FIG. 19B, thereby switching the priority group between the terminal B and the terminal C. In this case, the priority group is changed according to a traffic condition independent of the originally-set priority of the communication device or data stream, thereby updating the slot allocation table.

In addition to the transmission buffer volume information, a MAC rate, line information, a priority request flag, and the like, are available as information that can be used for grasping the traffic condition. The MAC rate is a result of calculation of a transmission rate per unit time performed by totaling pieces of packet length information (the number of bytes and the number of bits) in a header of each individual data stream. Line information is a result of calculation of a rate of occupancy of a medium (a rate of occupancy of a communication medium) per unit time by totaling an FL (the number of symbols) in a header of each individual data stream. The priority request flag is a flag provided in a header for sending a request of a preference to the master unit independent of a priority when DHCP, ARP, IGMP, M-Search, and the like, are available as an important control packet.

By means of such update processing, it is possible to grasp a traffic condition by use of the header information other than the priority information and to perform the updating of the slot allocation information so as to dynamically shift priorities of the priority groups based on the traffic condition.

Figure 20:
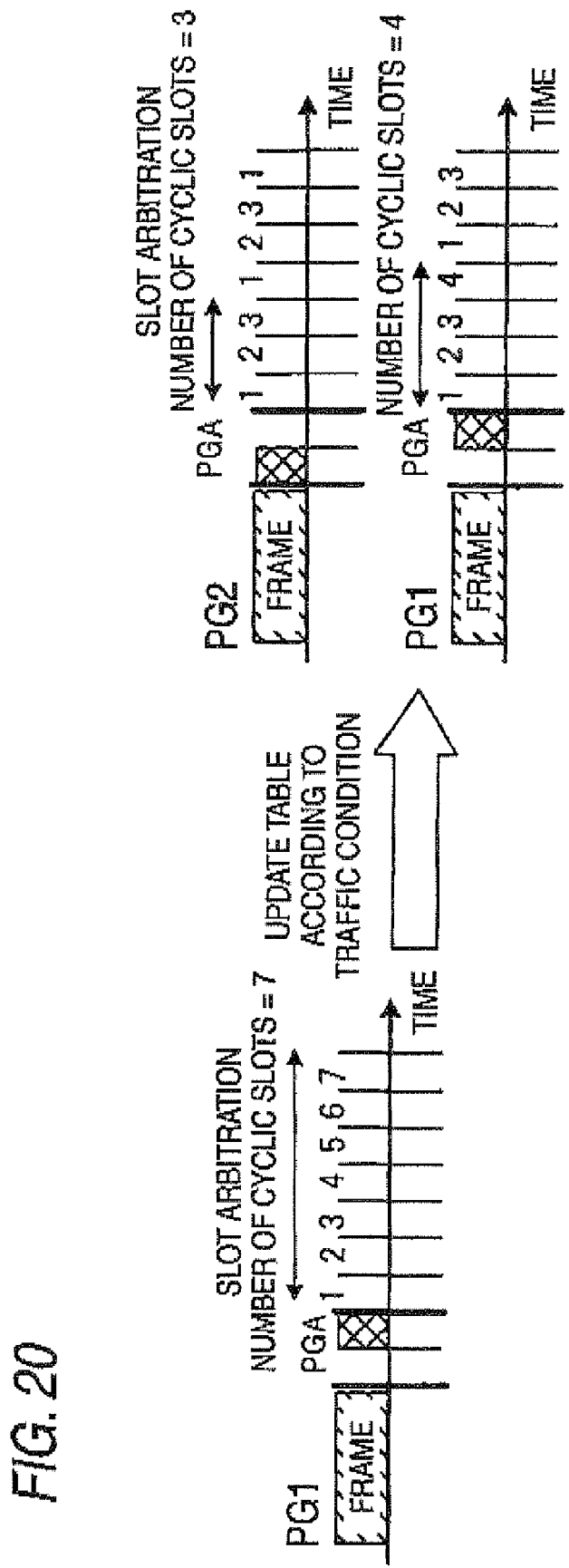
FIG. 20 is a view showing an example in which priority groups are shifted by means of updating the slot allocation table.

FIG. 20 is a view showing an example in which priority groups are shifted by means of updating the slot allocation table. An illustrated example shows a case where the number of cyclic slots of the priority group PG1 is seven and where the seven slots are allocated to the priority group PG1. The communication device working as a master unit updates the slot allocation table according to the traffic condition so as to allocate three slots to a higher-level priority group PG2 in a shifting manner and allocate four slots to the priority group PG1.

By the processing for shifting priority groups, the communication device working as the master unit can divide into a plurality of priority groups according to the traffic condition without the user or the network manager particularly setting priority information. It is also possible to allocate slots to the priority groups by means of well-balanced control such that the number of cyclic slots allocated to each of the priority groups does not become great. When the priority information is already set by the network manager, it may also be possible to determine the range of priority of the priority groups to be shifted in accordance with the combination of the set priority information and the traffic condition.

Figure 21:
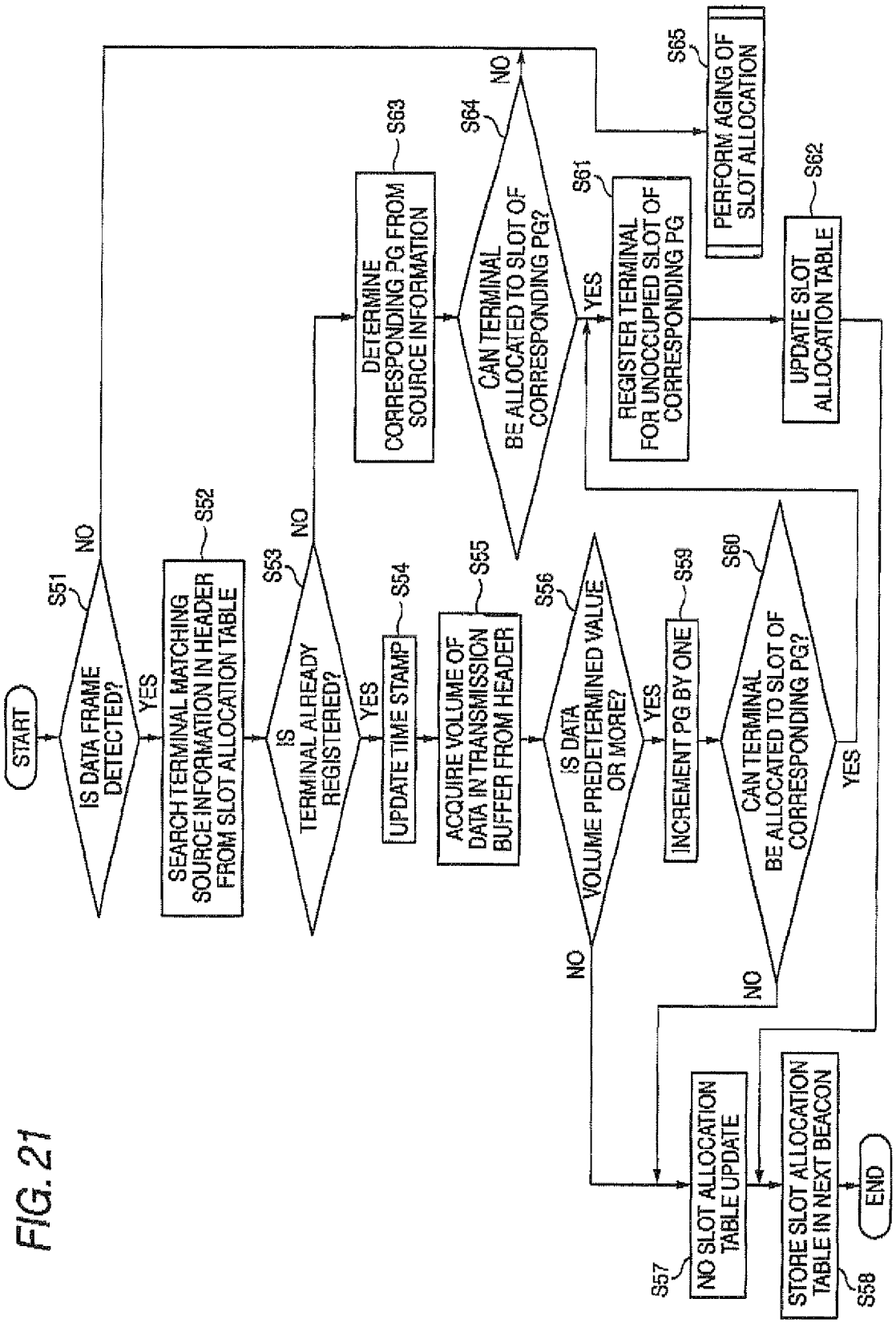
FIG. 21 is a flowchart showing operation procedures of slot allocation information update processing to be performed when priority groups are shifted.

FIG. 21 is a flowchart showing operation procedures of slot allocation information update processing to be performed when priority groups are shifted. Processing of the flowchart is basically performed for each individual predetermined period such as during idle time. The communication device working as the master unit determines whether or not the data frame transmitted from the stave unit or the master unit itself is detected (step S51). When the data frame is detected, reference is made to the slot allocation table, thereby searching a terminal coinciding with source information contained in a header of the data frame (step S52). It is determined whether or not the source address and a priority of the data frame are already registered in the slot allocation table (step S53). When the source address and the priority are already registered, a time stamp of a slot number of a corresponding priority group is updated (step S54).

Transmission buffer volume information is subsequently acquired from the header of the data frame (step S55), and it is determined whether or not the volume of data in the transmission buffer is a predetermined value or more (step S56). When the volume of information in the transmission buffer is less than a predetermined value, an update of the slot allocation table is taken as being unnecessary (step S57). The slot allocation table is stored in a next beacon frame (step S58). In the meantime, when the volume of data in the transmission buffer is a predetermined value or more, the priority level of the priority group to which the data frame belongs is incremented by one (step S59). It is then determined whether or not the terminal of that data frame can be allocated to any of slots of a corresponding priority group (step S60). When the terminal can be allocated, the source address of the terminal allocated to an unoccupied slot of the corresponding priority group and priority of the data stream are registered (step S61), and the slot allocation table is updated (step S62). Processing proceeds to step S58, where the updated slot allocation table is stored in the next beacon frame. When the terminal cannot be allocated to the corresponding slot of the priority group in step S60, processing proceeds to step S57, where an update of the slot allocation table is taken as being unnecessary. In step S58, the slot allocation table is stored in the next beacon frame.

In the meantime, when the source address and priority of the data frame are determined not to be already registered in the slot allocation table in step S53, a corresponding priority group is determined from the source information (step S63), and it is determined whether or not a terminal can be allocated to a slot of the corresponding priority group (step S64). When the terminal can be allocated, processing proceeds to step S61, where a source address of the terminal allocated to an unoccupied slot of the priority group and the priority of the data stream are registered in the corresponding priority group, and the slot allocation table is then updated in step S62. Processing proceeds to step S58, where an updated slot allocation table is stored in the next beacon frame.

When it is determined in step S64 that the terminal cannot be allocated to any of the slots of the corresponding priority group and when no data frame is detected in step S51, aging of slot allocation is carried out in the same manner as described in connection with steps S41 to S44 shown in FIG. 17 (step S65).

When the volume of data in the transmission buffer is determined in step S56, a different value may also be set as a predetermined value for each individual priority group. Alternatively, it may also be determined whether or not the volume of data in the transmission buffer is a predetermined value or less, and the priority level of a priority group of concerned may also be lowered by one when the volume of data is the predetermined value or less. Alternatively, updating of the priority groups may not be performed for each transmission/receipt of a frame. Instead, it may also be possible to sum volumes of data in transmission buffers for cues of data frames corresponding to respective allocated slots; to determine the volume of data in a transmission buffer per unit time; and to periodically compare the volumes of data in the transmission buffers of the respective slots with each other, thereby updating the priority groups.

[Example Applications (Variations) of Cyclic Slot Iteration]

Figure 22:
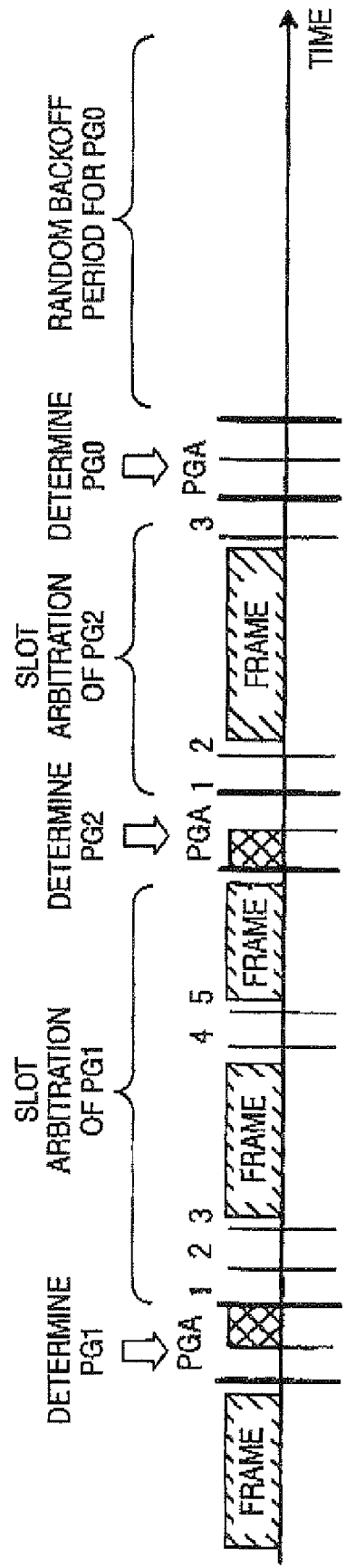
FIG. 22 is a view showing a first example of access period of a cyclic slot iteration scheme.

Several example applications of cyclic iteration of slots performed during the slot arbitration period are provided below. FIG. 22 is a view showing first example access period of a cyclic slot iteration scheme. In a first example (a first cyclic slot iteration scheme), cyclic slot iteration operations that are equal in number to cyclic slots allocated to a current priority group is taken as one in the slot arbitration period, and next PGA is not performed until slots are cyclically iterated by "n" turns. FIG. 22 shows a case where the number of cyclic slots of the priority group PG1 is set to five; where the number of cyclic slots of the priority group PG2 is set to three; where the priority group PG0 is not subjected to slot arbitration and a period for the priority group PG0 is taken as a random backoff period; and where "n" is set to one.

In this case, cyclic iteration of slots is performed at least one turn during the slot arbitration period of each of the priority groups. The number of turns of slot cyclic iteration ("n") performed until next PGA is performed is stored in the slot allocation table. Alternatively, a different number of turns ("n") of cyclic slot iteration may also be set for each individual priority group. In the first example, respective terminals generally become able to transmit a data frame of the priority group determined by one PGA operation during the slot arbitration period. In a case where the number of slots allocated to each of the priority groups is large and where a data frame is rarely transmitted from terminals, there is often a case where a bandwidth becomes wasted. For instance, when a data frame to be transmitted has arisen in a priority group having a high priority in the middle of many cyclic slot iteration operations are performed by a priority group having a low priority, there is often a case where a time is consumed before transmission of the data frame.

FIG. 23 is a view showing second example access period of the cyclic slot iteration scheme. The second example (the second cyclic slot iteration scheme) is for carrying out the next PGA every time transmission of a data frame is completed during the slot arbitration period. In FIG. 23, the number of cyclic slots of the priority group PG1 is set to five; where the number of cyclic slots of the priority group PG2 is set to three in the same manner as in FIG. 22. When a data frame is transmitted during a slot arbitration period subsequent to PGA, the next PGA is commenced after completion of transmission. In this case, each of the terminals stores a slot number having completed transmission last time for each individual priority group. In connection with the next priority group acquired an access right through PGA, counting of a slot number next to the stored slot number is commenced without interruption.

Figures 24A, 24B:
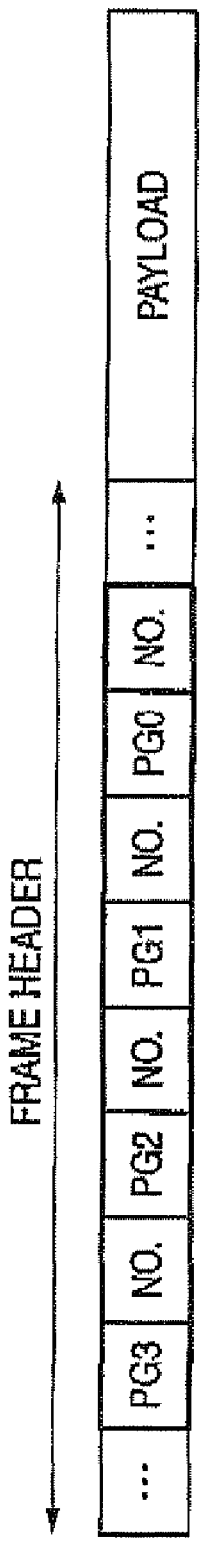
FIGS. 24A and 24B are views showing an example method for storing slot numbers.

FIGS. 24A and 24B are views showing an example method for storing slot numbers. For instance, as shown in FIG. 24A, a slot number table is provided in each of the terminals. In this case, each of the terminals counts a slot number when cyclic slot iteration is commenced during a slot arbitration period and stores a slot number by way of which a data frame has been transmitted and to which an access has been made. A header of the data frame includes a slot ID corresponding to the slot number. Each of the terminals acquires the slot ID during receiving operation and stores the value of the slot number or slot ID into a slot number table. Every time a data frame is received and an access is detected, the slot number tables for the respective priority groups are updated. When the priority group acquired an access right is switched by means of PGA, cyclic slot iteration is commenced from a slot number of the priority group stored last time. Each of the respective terminals clears its slot number table every time received a beacon frame.

FIG. 24B shows an example application of the method for storing slot numbers; namely, such a slot number table for each individual priority group as shown in FIG. 24A is stored in the header of the frame. In this case, even when a certain terminal failed to detect an access of another device, another terminal successfully detected the access can transmit information about the slot number to another terminal by means of the data frame. As a result, occurrence of a mismatch between slot numbers of terminals can be prevented, so that collision, which would otherwise occur during slot arbitration, can be voided.

The second example makes it possible to carry out arbitration appropriate to the priority of a priority group by means of PGA when a priority group having a high priority has many opportunities of transmitting a data frame. In this case, a PGA time is inserted every time transmission of a data frame is completed. Hence, there is often a case where a bandwidth becomes wasted when PGA is not required. For instance, when slots are allocated to only one priority group and when no slots are allocated to the other priority groups, an unwanted PGA time is provided every time transmission of a data frame is completed.

Figure 25:
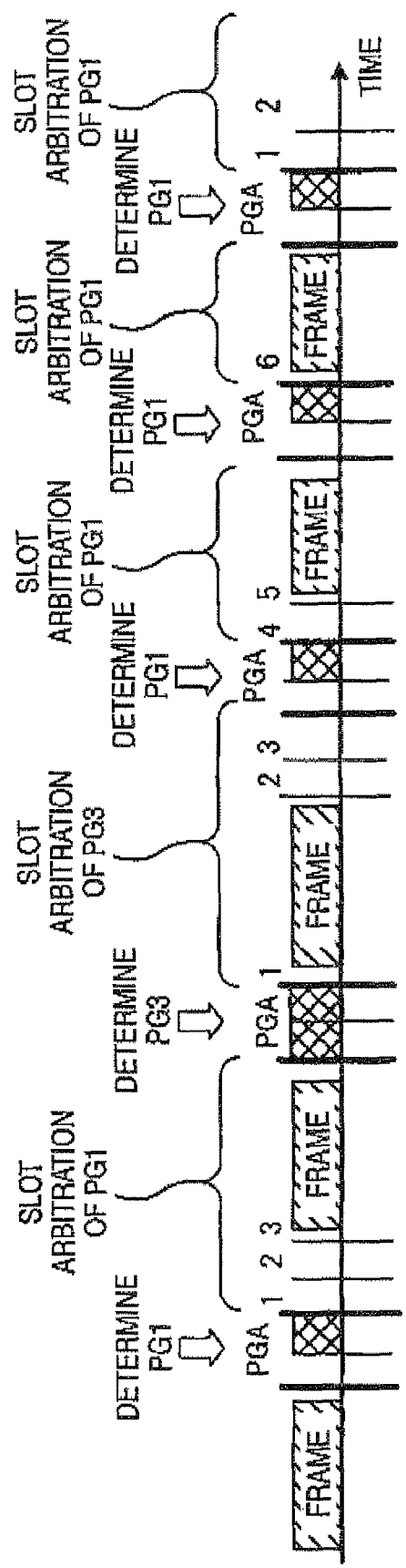
FIG. 25 is a view showing a third example of access period of the cyclic slot iteration scheme.

FIG. 25 is a view showing third example access period of the cyclic slot iteration scheme. The third example is a combination of the first example with the second example, and the first example and the second example are selectively used for each individual priority group. For instance, the first example is applied to the priority group PG3 having a high priority, and the second example is applied to the priority group PG1 having a low priority, as illustrated in the example. In FIG. 25, the number of cyclic slots of the priority group PG3 is set to three, and the number of cyclic slots of the priority group PG1 is set to six. When the priority group PG3 has acquired an access right through PGA, cyclic slot iteration is performed "n" turns during the slot arbitration period, and the next PGA is subsequently carried out. For the sake of brevity, "n" is set to one. When the priority group PG1 has acquired an access right through PGA, the next PGA is carried out after completion of transmission of a data frame every time any terminal has transmitted a data frame.

In FIG. 25, it is assumed that, after an access right is determined to be granted to the priority group PG1 by means of the first PGA, slot arbitration is carried out and that a data frame is transmitted from slot number 3. In this case, PGA is carried out after transmission of a data frame. It is also assumed that, after an access right is determined to be granted to the priority group PG3 through second PGA, slot arbitration is carried out; and that a data frame is transmitted from slot number 1. In this case, the next PGA is carried out after cyclic slot iteration is carried out one turn up to the slot number 3. Next, when an access right is determined to be granted to the priority group PG1 by means of third PGA, cyclic slot iteration is commenced from slot number 4 during the slot arbitration period. When a data frame is transmitted from slot number 5, PGA is carried out after transmission of the data frame. When an access right is determined to be granted to the priority group PG1 by means of fourth PGA, cyclic slot iteration is commenced from slot number 6 during the slot arbitration period. When a data frame is transmitted from slot number 6, PGA is carried out after transmission of a data frame. Subsequently, when an access right is determined to be granted to the priority group PG1 through fifth PGA, cyclic slot iteration of the priority group PG1 is performed one turn, and hence cyclic slot iteration is again started from slot number 1.

FIG. 26 is a view showing an example slot allocation table conforming to the third example cyclic slot iteration scheme. In the third example, cyclic slot iteration scheme information showing which one of the first and second example schemes is applied is set and stored for each individual priority group. For instance, when the cyclic slot iteration scheme information represents zero, the first example scheme is assumed to be selected. When the cyclic slot iteration scheme information represents one, the second example scheme is assumed to be selected. In the case of the first example scheme, the cyclic slot iteration scheme information may also include the value of a cyclic slot iteration turn "n" showing the number of turns cyclic iteration is to be performed.

In the case of the third example, when an access right is acquired by one PGA, each of the terminals has one opportunity of transmission in the priority group PG3. Moreover, even after the priority group PG1 has acquired an access right, an opportunity for transmission immediately arises. Therefore, high priority data; for instance, VoIP, are allocated to the priority group PG3, and the first example scheme is applied. Even when a network is congested by other jamming data, data transmission can immediately be performed. In the case of VoIP, communication is conducted in both directions, and data transmission in an opposite direction is inevitably conducted in response to one data transmission. Therefore, there is a high probability of data frames of the same priority group occurring. Accordingly, occurrence of a delay can be prevented by performing appropriate access control for each priority group.

[Example Modifications of Cyclic Slot Iteration]

Figure 27A:
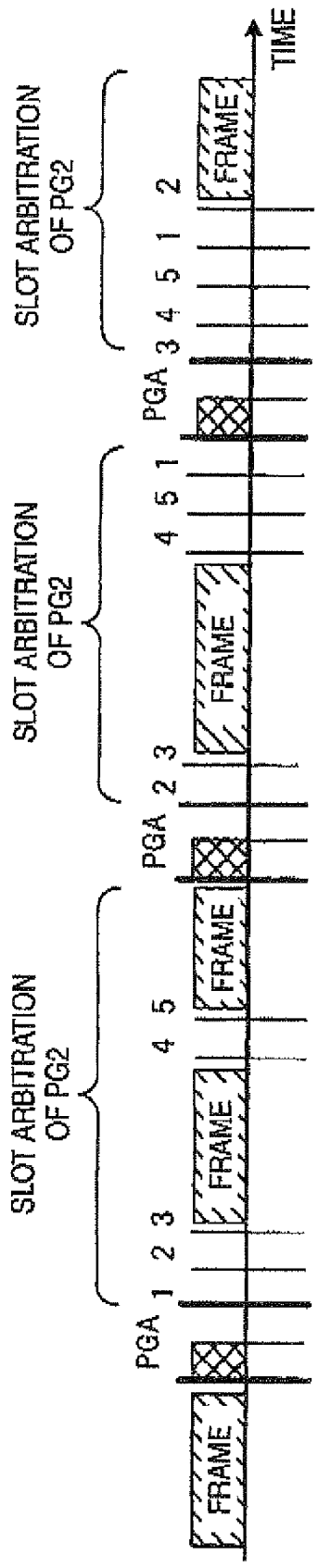
FIGS. 27A and 27B are views showing example modifications of the cyclic slot iteration scheme.
Figure 27B:
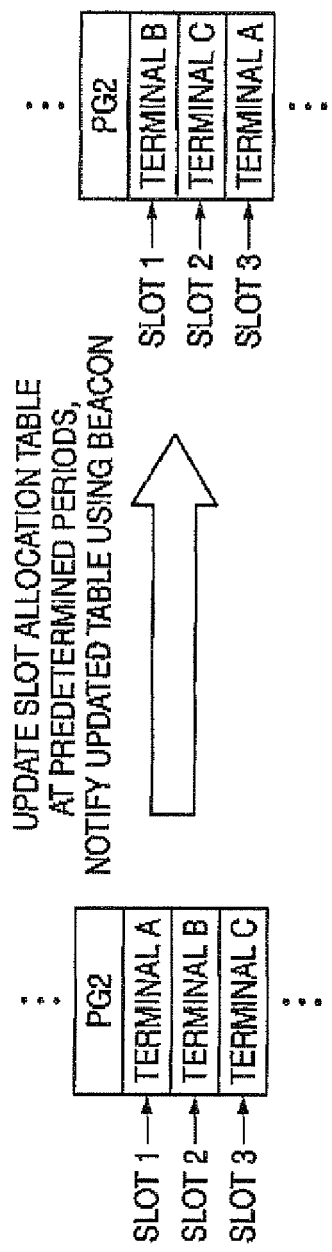

FIGS. 27A and 27B are views showing example modifications of the cyclic slot iteration scheme. FIG. 27A shows access period of a first example modification, and FIG. 27B shows slot allocation table update processing of a second example modification. The example modifications shown in FIGS. 27A and 27B correspond to the partially-changed cyclic slot iteration method of the third example. In the first example or the third example mixedly including the first example and the second example, when cyclic slot iteration is performed "n" turns after PGA, a data frame allocated to a lower slot number always becomes advantageous, so long as cyclic slot iteration is started from slot number 1. Accordingly, a method for avoiding a delay of a data frame allocated to a higher slot number is hereunder provided as example modifications.

The first example modification shown in FIG. 27A is for periodically shifting initiation of slot number performed during cyclic slot iteration. In an illustrated example, the cyclic slot number of the priority group PG2 is set to five. When the priority group PG2 has acquired an access right, a slot number from which cyclic slot iteration starts is incremented by one, to thus be shifted, every time cyclic slot iteration is performed one turn.

The second example modification in FIG. 27B is for shifting a slot number allocated to each terminal and data for each predetermined period, to thus update a slot allocation table for each individual priority group. In the illustrated example, slot numbers are changed for each predetermined period in connection with the terminals A to C allocated to slot numbers 1 through 3 of the priority group PG2, and the thus-updated slot allocation table is notified to the respective terminals by means of beacon frames, and the like. In the second example modification, each of the terminals does not need to perform complicate control, such shifting a slot number by use of a slot number table as shown in FIG. 24A, updating of the slot allocation table can readily be implemented by means of slot allocation table update processing of the master unit.

When cyclic slot iteration is performed "n" turns during the slot arbitration period, the value of the number of cyclic slot iteration turns "n" can also be changed according to a traffic condition. For instance, when the total volume of data in the transmission buffers of the respective terminals allocated to the respective slots of the priority group PG3 is greater than a predetermined value, the number of cyclic slot iteration turns "n" of the priority group PG3 may also be increased by one to n+1. In contrast, when the total volume of data in the transmission buffers of the respective terminals allocated to the respective slots of the priority group PG3 is smaller than the predetermined value and when the total volume of data in the transmission buffers of the respective terminals allocated to the respective slots of the priority group PG2 is greater than the predetermined value, the number of cyclic slot iteration turns "n" of the priority group PG3 may also be decreased by one to n−1, and the number of cyclic slot iteration turns "n" of the priority group PG2 may also be increased by one to n+1. Alternatively, the number of cyclic slot iteration turns "n" of the respective priority groups may also be increased or decreased by comparison of the rate of occupancy of a medium with a predetermined value. At this time, the number of cyclic slot iteration turns "n" of the respective priority groups are stored along with the cyclic slot iteration scheme information in the slot allocation table shown in FIG. 26. The number of cyclic slot iteration turns is increased or decreased according to a traffic condition as mentioned above, whereby data transmission efficiency can be enhanced.

In the embodiment, PGA and slot arbitration are used in combination. Arbitration that is performed on a per-priority-group basis through PGA and arbitration conforming to slot allocation determined by slot arbitration are used, whereby problems resultant from sole use of PGA and slot arbitration can be solved. Specifically, wasteful consumption of a bandwidth, which would otherwise arise when the number of allocated slots is increased, is prevented, whereby performance deterioration can be prevented. Further, collision between terminals belonging to the same priority group can be voided, so that performance deterioration, which would otherwise be caused by collision, can be prevented.

Slot allocation information is dynamically updated according to a traffic condition of a network while appropriate access control is conducted for each individual priority group conforming to a priority of a data stream to be transmitted, thereby changing priority groups, and the like. Access control more appropriate for the current status thus becomes possible. At this time, it is possible to perform well-balanced control, such as setting of priority groups conforming to a traffic condition, adjustment of the number of slots to be allocated for each individual priority group, and change of the number of cyclic slot iteration turns achieved through slot arbitration, and the like. Data transmission appropriate to a status thus becomes possible, and performance of the entire network can be enhanced. A cyclic slot iteration method appropriate for slot arbitration is selected for each individual priority group, whereby wastes of a bandwidth caused by access control are eliminated. Occurrence of a delay in high priority data is prevented, and data transmission efficiency can be enhanced. Moreover, a slot number from which cyclic slot iteration is started is shifted during slot arbitration, whereby an imbalanced opportunity for transmission of respective sets of data is eliminated, and occurrence of a delay can be inhibited.

The present invention is not limited to the configurations described in connection with the embodiment and is also scheduled to be subjected to modification and application by those skilled in the art on the basis of the descriptions of the patent specification and the well-known technique. The modifications and applications shall fall within a scope where protection is to be sought.

The present application is based on Japanese Patent Application No. 2008-322278 filed on Dec. 18, 2008, the contents of which are incorporated herein for reference.

Industrial Applicability

The present invention enables arbitration of access contention within a comparatively short period of time even when the number of communication devices or data streams is increased, thereby yielding an advantage of inhibiting performance deterioration by preventing wasting of a bandwidth, an advantage of voiding occurrence of collision between communication devices having the same priority when priority control is performed, and an advantage of making it possible to perform access control appropriate to a traffic condition, such as the communication volume, by preventing imbalanced concentration of an access right to a specific communication device or data. Thus, the present invention is useful as a communication method and a communication device that establish communication among a plurality of communication devices sharing a communication band.

What is claimed is:

1. A communication method for performing a communication among a plurality of communication devices sharing a communication band, comprising:
   a first step of transmitting notification signal during a first period to notify information for arbitrating the communication device capable of performing data transmission during a second period subsequent to the first period; and
   a second step of transmitting data from the communication device, capable of performing the data transmission during the second period based on the notification signal transmitted during the first period, in specific period in the second period allocated to the data transmitted from the communication device,
   wherein priority groups indicating the priority of the data or the communication device is used for categorizing the communication device capable of performing the data transmission during the second period;
   wherein slots for dividing the second period are used as the specific period in the second period, and the slots are allocated to the data or the communication device for each of the priority groups, slot IDs being applied to the slots respectively; and
   wherein the communication device, capable of performing the data transmission during the second period in the second step, transmit the data in the second period or at the period of the slot IDs allocated to the data of the communication device itself when another signal already transmitted is not detected during the second period.

2. The communication method according to claim 1, further comprising:
   a third step of changing the notification signal in the first period by a control section the communication device connected to a communication medium, according to a traffic condition of the communication medium including the data transmitted during the second period.

3. The communication method according to claim 2, wherein, in the third step, the notification signal is changed in the first period in accordance with a volume of data stored in transmission buffers of the communication device including the communication device capable of performing the data transmission in the second period and a priority previously determined according to a data type of data, the volume of data being determined as the traffic condition of the communication medium.

4. The communication method according to claim 1, wherein priority groups indicating the priority of the data or the communication device are used for categorizing the communication device capable of performing the data transmission during the second period;
wherein the notification signal in the first period respectively include information for notifying the priority group allocated to the data transmitted from the communication device or the communication device itself; and
wherein the communication device of the priority group having high priority, the communication device transmitting the notification signal during the first period, is set to be able to transmit the data in the second period.

5. The communication method according to claim 1, further comprising:
a third step of transmitting data from the communication device in a case that the data is not transmitted from the communication device capable of performing the data transmission during the second period and when another signal already transmitted at arbitrary period is not detected during a third period subsequent to the second period.

6. The communication method according to claim 1, wherein a control section of the communication device allocates the data and the communication device to the slots in each of the priority groups, the communication method further comprising:
a step for notifying slot allocation information to the communication device respectively by transmitting a notify frame at every predetermined period, the slot allocation information indicating an allocation of the data and the communication device to the slots in each of the priority groups.

7. The communication method according to claim 6, wherein the communication device detects a transmission signal from the communication device itself; and
wherein the control section of the communication device changes an allocation of the data and the communication device to the slots in each of the priority groups according to the traffic condition in the communication medium determined by a detection of the transmission signal and transmits updated slot information.

8. The communication method according to claim 7, wherein when a volume of data stored in a transmission buffer of the communication device, employed as the traffic condition of the communication medium, is a predetermined value or more, the control section shifts allocation of a priority group to which corresponding data and a corresponding communication device belong to another priority group having a higher priority.

9. The communication method according to claim 7, wherein when a volume of data stored in a transmission buffer of the communication device, employed as the traffic condition of the communication medium, is less than a predetermined value, the control section shifts allocation of a priority group to which corresponding data and a corresponding communication device belong to another priority group having a lower priority.

10. The communication method according to claim 7, wherein the traffic condition of the communication medium is depended on whether there is transmission data in the first period and the second period, and when the transmission data is not detected for a predetermined period in connection with the data and the communication device allocated to the slots in each of the priority groups, the control section releases a corresponding slot.

11. The communication method according to claim 6, wherein, when transmission data not allocated to the slots in each of the priority groups is detected, the control section determines a priority group in accordance with source information of the data; and
wherein, when the transmission data can be allocated to the determined priority group, the control section allocates the data and a communication device transmitting the data to an unoccupied slot in the determined priority group.

12. The communication method according to claim 6, wherein the slot allocation information includes PGA presence/absence information indicating presence or absence of the first period for arbitrating the communication devices based on the priority group; and wherein, when the PGA presence/absence information indicates absence of PGA, each of the communication devices performs arbitration of a slot allocation during the second period without setting the first period.

13. The communication method according to claim 6, wherein a first cyclic slot iteration scheme for subjecting next priority group to arbitration during the first period after slot IDs for each of the priority groups indicated in the slot allocation information are cyclically iterated "n" turns during the second period is employed.

14. The communication method according to claim 13, wherein the control section changes the number of turns "n" of cyclically iterating the slot IDs during the second period, based on the traffic condition of the communication medium.

15. The communication method according to claim 6, wherein a second cyclic slot iteration scheme for subjecting the next priority group to arbitration during the first period every time data transmission from any of the communication devices is completed during the second period is employed.

16. The communication method according to claim 6, wherein a first cyclic slot iteration scheme or a second cyclic slot iteration scheme is employed based on the priority groups;
wherein the first cyclic slot iteration scheme subjects next priority group to arbitration during the first period after slot IDs for each of the priority groups indicated in the slot allocation information are cyclically iterated "n" turns during the second period; and
wherein the second cyclic slot iteration scheme for subjecting the next priority group to the arbitration during the first period every time data transmission from the communication device is completed during the second period.

17. The communication method according to claim 1, wherein the slot IDs for the priority groups are stored in the second period, and the slot ID for initiating cyclic iteration in the next second period is changed to another slot ID applied to the priority group capable of performing the data transmission.

18. A communication device used in a communication system for performing a communication among a plurality of communication devices sharing a communication band, comprising:
an arbitrary information notification section that transmits a notification signal during a first period to notify information for arbitrating a communication device capable of performing data transmission during a second period subsequent to the first period; and
a data transmission section that, when the communication device transmitting the notification signal is determined as the communication device capable of performing the data transmission based on the notification signal transmitted during the first period, transmits data in specific period in the second period allocated to the data transmitted from the communication device, wherein a signal set on the basis of priority previously determined according to a data type is used as the notification signal in the first period,
wherein priority groups indicating the priority of the data or the communication devices are set as groups for categorizing the communication devices capable of performing the data transmission during the second period;
wherein slots for dividing the second period are used as the specific period in the second period, and the slots are allocated to the data or the communication devices for each of the priority groups, slot IDs being applied to the slots respectively; and
wherein the data transmission section transmits the data at the period of the slot ID allocated to the data of the communication device or the communication device itself when another signal already transmitted is not detected during the second period.

19. The communication device according to claim 18, wherein a signal set according to a traffic condition of a communication medium including the data transmitted during the second period and the priority previously determined according to the data type is used as the notification signal in the first period.

20. The communication device according to claim 18, wherein priority groups indicating the priority of the data or the communication devices are set for categorizing the communication devices capable of performing the data transmission during the second period;
wherein the arbitration information notification section notifies, as the notification signal in the first period, information including the priority group allocated to the data transmitted from the communication device or the communication device itself; and
wherein the communication device is set to be able to transmit the data in the second period when the communication device belongs to a priority group having the highest priority, among the communication devices have transmitted the notification signals during the first period.

21. The communication device according to claim 18, wherein the data transmission section transmits data in a case that the communication device is not able to transmit the data during the second period and no data are transmitted from the other communication devices during the second period and when another signal already transmitted at arbitrary period is not detected during a third period subsequent to the second period.

22. The communication device according to claim 18, further comprising:
a control section that allocates the data and the communication devices to the slots in each of the priority groups based on the traffic condition of the communication medium including the data transmitted during the second period and that transmits slot allocation information to the other communication devices by transmitting a notify frame at a predetermined period.

23. The communication device according to claim 22, wherein the control section detects transmission signals of all of the communication devices, changes allocation of the data and the communication devices to the slots in each of the priority groups in accordance with the traffic condition of the communication medium based on a detection result of the transmission signals, and transmits updated slot allocation information to other communication devices.

24. The communication device according to claim 23, wherein when a volume of data stored in a transmission buffer of the communication device, employed as the traffic condition of the communication medium, is a predetermined value or more, the control section shifts allocation of a priority group to which corresponding data and a corresponding communication device belong to another priority group having a higher priority.

25. The communication device according to claim 23, wherein when a volume of data stored in a transmission buffer of the communication device, employed as the traffic condition of the communication medium, is less than a predetermined value, the control section shifts allocation of a priority group to which corresponding data and a corresponding communication device belong to another priority group having a lower priority.

26. The communication device according to claim 23, wherein the control section determines the traffic condition of the communication medium based on whether there is transmission data in the first period and the second period;
wherein when the transmission data is not detected for a predetermined period in connection with the data and the communication devices allocated to the slots in each of the priority groups, the control section releases a corresponding slot.

27. The communication device according to claim 22, wherein, when transmission data not allocated to the slots in each of the priority groups is detected, the control section determines a priority group in accordance with source information of the data; and
wherein, when the transmission data can be allocated to the determined priority group, the data and a communication device are allocated to an unoccupied slot in the determined priority group.

28. A communication method for performing a communication between a first group including at least one of communication devices and a second group including at least one of communication devices, comprising:
transmitting a first notification signal from a communication device included in the first group and a second notification signal from a communication device included in the second group during a first period for arbitration between the first group and the second group; and
transmitting data from the communication device included in one of the first group and the second group in the second period after the first period on the basis of the arbitration.

* * * * *